United States Patent [19]

Ishida et al.

[11] Patent Number: 5,715,442
[45] Date of Patent: Feb. 3, 1998

[54] DATA UNIT GROUP HANDLING APPARATUS

[75] Inventors: Eiji Ishida, Yokohama; Yoshifumi Matsunaga, Nakai-machi; Toshikatsu Suzuki, Nakai-machi; Shinichiro Taniguchi, Nakai-machi; Hiroyuki Ishima, Nakai-machi, all of Japan

[73] Assignee: Fuji Xerox Co., Ltd., Tokyo, Japan

[21] Appl. No.: 637,548

[22] Filed: Apr. 25, 1996

[30] Foreign Application Priority Data

May 17, 1995 [JP] Japan .................... 7-142697

[51] Int. Cl.⁶ .................................... G06F 17/30
[52] U.S. Cl. ............... 395/601; 395/611; 395/612; 395/615; 395/760; 395/794
[58] Field of Search ............... 395/601, 611, 395/612, 615, 760, 794

[56] References Cited

U.S. PATENT DOCUMENTS

| 5,388,257 | 2/1995 | Bauer | 395/601 |
| 5,418,946 | 5/1995 | Mori | 395/601 |
| 5,511,186 | 4/1996 | Carhart et al. | 395/602 |
| 5,522,066 | 5/1996 | Lu | 395/601 |
| 5,557,794 | 9/1996 | Matsunaga et al. | 395/603 |

FOREIGN PATENT DOCUMENTS

A-62-287336  12/1987  Japan.
A-4-195680   7/1992   Japan.

*Primary Examiner*—Paul V. Kulik
*Attorney, Agent, or Firm*—Oliff & Berridge, P.L.C.

[57] ABSTRACT

A data unit group handling apparatus which handles a file system for storing a plurality of files defined by different kind of file formats, and at least one of the files is a data unit group which is defined by a predetermined file format, includes data units and can be located in any location in the file system. In the apparatus, at least one data unit group is retrieved from the file system in accordance with the file format, a selection instruction is received from a user to select at least one of the data unit group from the retrieved at least one data unit group, retrieval condition to retrieve at least one data unit is also received, and at least one of the data unit matching to the received retrieval condition from the at least one of the data unit group which is selected in accordance with the received selection instruction.

16 Claims, 28 Drawing Sheets

FIG. 3B

TABLE

| HASH VALUE | ADDRESS |
|---|---|
| 1 | 001 |
| 2 | 004 |

INDEX

| | RETRIEVAL KEY | NEXT POINTER | ADDRESS |
|---|---|---|---|
| 001 | APPLE | 002 | 101 |
| 002 | PARSLEY | 003 | 104 |
| 003 | GRAPE | • | 105 |
| 004 | CEDER | 005 | 102 |
| 005 | CHESTNUT | 006 | 103 |
| 006 | PINE | • | 106 |

DATA

| | HEAD WORD | DATA BODY |
|---|---|---|
| 101 | APPLE | APPLE |
| 102 | CEDER | CEDER |
| 103 | CHESTNUT | CHESTNUT |
| 104 | PARSLEY | PARSLEY |
| 105 | GRAPE | GRAPE |
| 106 | PINE | PINE |

| DATA UNIT GROUP NAME | LOCATION INFORMATION |
|---|---|
| 1993 PAPERS | /LITERATURE/1993 PAPERS |
| OTHER PARTIES' PATENT | /LITERATURE/OTHER PARTIES' PATENT |
| BIBLIOGRAPHY DATA | /LITERATURE/BOOK AND CITATION/BIBLIOGRAPHY DATA |
| CITATIONS | /LITERATURE/BOOK AND CITATION/CITATIONS |
| DESIGN IMAGE | /IMAGE INFORMATION/DESIGN IMAGE |

FIG. 8A

| DATA UNIT GROUP NAME | LOCATION INFORMATION |
|---|---|
| 1993 PAPERS | /LITERATURE/1993 PAPERS |
| OTHER PARTIES' PATENT | /LITERATURE/OTHER PARTIES' PATENT |
| BIBLIOGRAPHY DATA | /LITERATURE/BOOK AND CITATION/BIBLIOGRAPHY DATA |
| CITATIONS | /LITERATURE/BOOK AND CITATION/BIBLIOGRAPHY DATA |
| DESIGN IMAGE | /IMAGE INFORMATION/DESIGN IMAGE |
| BIBLIOGRAPHY DATA & DESIGN IMAGE | RELATIONAL INFORMATION 1 |

FIG. 8B

| NUMBER | LOCATION INFORMATION |
|---|---|
| 0 | /LITERATURE |
| 1 | /LITERATURE/BOOK AND CITATION |
| 2 | /IMAGE INFORMATION |

FIG. 12

| DATA UNIT GROUP NAME | LOCATION INFORMATION |
|---|---|
| BIBLIOGRAPHY DATA | /LITERATURE/BOOK AND CITATION/BIBLIOGRAPHY DATA |
| DESIGN IMAGE | /IMAGE INFORMATION/DESIGN IMAGE |

FIG. 15

| ORDER OF SELECTION | DATA UNIT GROUP NAME | LOCATION INFORMATION |
|---|---|---|
| 1 | BIBLIOGRAPHY DATA | /LITERATURE/BOOK AND CITATION /BIBLIOGRAPHY DATA |
| 2 | DESIGN IMAGE | /IMAGE INFORMATION/DESIGN IMAGE |

FIG. 17

| HEAD WORDS | DATA UNIT GROUP BELONGING TO | LOCATION |
|---|---|---|
| ENVIROMENTAL ASSESSMENT AND DESIGN | BIBLIOGRAPHY DATA | 44563 |
| STRUCTURAL ANALYSIS OF HYPERTEXT | BIBLIOGRAPHY DATA | 11264 |
| THE CHANGE OF THE INTERACTION SPACE | DESIGN IMAGE | 22357 |
| THE CONCEPT SAVE YOUR BODY | DESIGN IMAGE | 11124 |
| TASK ACHIEVEMENT BY BREAKDOWN | DESIGN IMAGE | 22198 |
| WORKING MEMORY AND SYSTEM DESIGN | DESIGN IMAGE | 56003 |
| ABOUT WYSIWYG | DESIGN IMAGE | 45448 |

FIG. 19

| HORIZONTAL ANALYSIS CONDITION | VERTICAL ANALYSIS CONDITION |
|---|---|
| DESIGN → 10 | RANDOM VALUE |
| IMAGE → 20 | RANDOM VALUE |
| SENSE → 30 | RANDOM VALUE |

FIG. 26

DATA UNIT GROUP HANDLING APPARATUS

BACKGROUND OF THE INVENTION

1. Field of the Invention

The present invention relates to an apparatus for retrieving or analyzing data storing in a plurality of data unit groups such as databases.

2. Description of the Related Art

In this specification, a data unit represents a set of data components having a name (or a head word). The character string represents the data, but other electronically representable things, such as an image, a sound or an animation, are also acceptable. Further, considering the convenience of retrieval, the data unit preferably includes attribute values for representing the characteristics thereof, such as keywords. A data unit group represents a set including a plurality of the data units. In this invention, the situation, which a plurality of data unit groups are existing in the file system and also they are scattered about among other files, is considered.

An electronic dictionary represents the data unit group. A data unit includes, for instance, a head word such as the word "apple" and a data body having a description such as a pronunciation, a meaning and an example of the head word. And a whole English-Japanese dictionary represents a data unit group. Further, an example of the situation which a plurality of data unit groups exist is that Japanese dictionary, Japanese-English dictionary, French dictionary and others exist other than the English-Japanese dictionary. The data storing in the dictionary is not usually edited, but it is assumed that the data unit group in this invention could be edited, converted or transferred.

An other example of the data unit group is a database. A record in the database corresponds to the data unit. And a whole of the database for a particular field corresponds to the data unit group.

There are conventional arts to deal with a plurality of the data unit groups simultaneously, such as Japanese Laid-Open Patent Publication Sho. 62-287336 and Japanese Laid-Open Patent Publication Hei. 4-195680. The Sho. 62-287336 discloses the art that a user selects a plurality of dictionaries to be searched simultaneously. In this art, the names of dictionaries which exists in the specified disc apparatus and the dictionary information server, are displayed. A user can freely select some of dictionaries from a plurality of dictionaries of those whose names are displayed and use them simultaneously, or after the search of the first dictionary, can select the next search condition from the result of the search of the first dictionary to search the second dictionary using the selected search condition. Hei. 4-195680 also discloses the art for utilizing a plurality of the dictionaries. In this art, the dictionaries are classified in two groups, that is "contents explanation" and "conversion", and a table to store how to use those dictionaries is predetermined. This makes possible to consult the dictionary after the converted result by "conversion" dictionary under predetermined rules. Further, a user can make any application suited to any situation by defining a table which includes the dictionaries and their priorities.

These arts, however, assume that available data unit groups or locations where they exist, are predetermined. Further, it is not considered that a file which is not available in the system mixedly exists in the predetermined location where the data unit group must exist. This easily happens in the situation which an user can freely locate a file in any location in the file system, delete it or move it. In this situation, there is a danger to supply an unavailable file to users as an available one. Also because the user must maintain the table described above, it is impossible to search those data unit groups successively, in a same time, dynamically add new data unit group or delete one.

SUMMARY OF THE INVENTION

One of the objects of the present invention is automatic retrieval of the data unit group which is available for the system in the situation which the data unit groups are scattered about in an ordinary file system.

Another object of this invention is to determine the combination of the data unit groups dynamically and freely by the user, and to search or analyze the determined data unit groups.

According to a first aspect of the present invention, there is provided a data unit group handling apparatus which comprises a file system for storing a plurality of files defined by different kind of file formats, and at least one of the files is a data unit group which is defined by a predetermined file format, includes data units and can be located in any location in the file system, group retrieving means for retrieving at least one data unit group from said file system in accordance with the file format; group selecting means for receiving a selection instruction from a user to select at least one of the data unit group from the at least one data unit group retrieved by said group retrieving means, retrieval condition receiving means for receiving retrieval condition to retrieve at least one data unit, and data unit retrieving means for retrieving at least one of the data unit matching to the retrieval condition received by said retrieval condition receiving means from the at least one of the data unit group which is selected in accordance with the selection instruction received by the group selecting means.

According to another aspect of the present invention, there is provided a data unit group handling apparatus which comprises a file system for storing a plurality of files defined by different kind of file formats, and at least one of the files is a data unit group which is defined by a predetermined file format, includes data units and can be located in any location in the file system, group retrieving means for retrieving at least one data unit group from said file system in accordance with the file format, group selecting means for receiving a selection instruction from a user to select at least one of the data unit group from the at least one data unit group retrieved by said group retrieving means, analysis condition storing means for storing a analysis condition to analyze the data unit, analysis value calculating means for calculating an analysis value of the data unit included in said at least one of the data unit group selected by said group selecting means in accordance with the analysis condition stored in said analysis condition storing means, position calculating means for calculating a position where an image element which graphically represents existence of the data unit is arranged, and analysis image generating means for generating the analysis image which includes the image element of the data unit at the position calculated by said position calculated means.

BRIEF DESCRIPTION OF THE DRAWINGS

FIGS. 3A-3B are an example of a structure of the data unit group in this invention;

FIGS. 8A-8B are an example of data stored in the group name storing section;

FIG. 12 is an example showing the data stored in the location storing section 2;

FIG. 15 is an example of data stored in the selection result storing section (without ordering);

FIG. 17 is an example of data stored in the selection result storing section (with ordering);

FIG. 19 is an example showing the list of the retrieved data units;

FIG. 26 is an example of data stored in the analysis value calculating section 15;

DESCRIPTION OF THE PREFERRED EMBODIMENTS (First embodiment)

Figure 1:
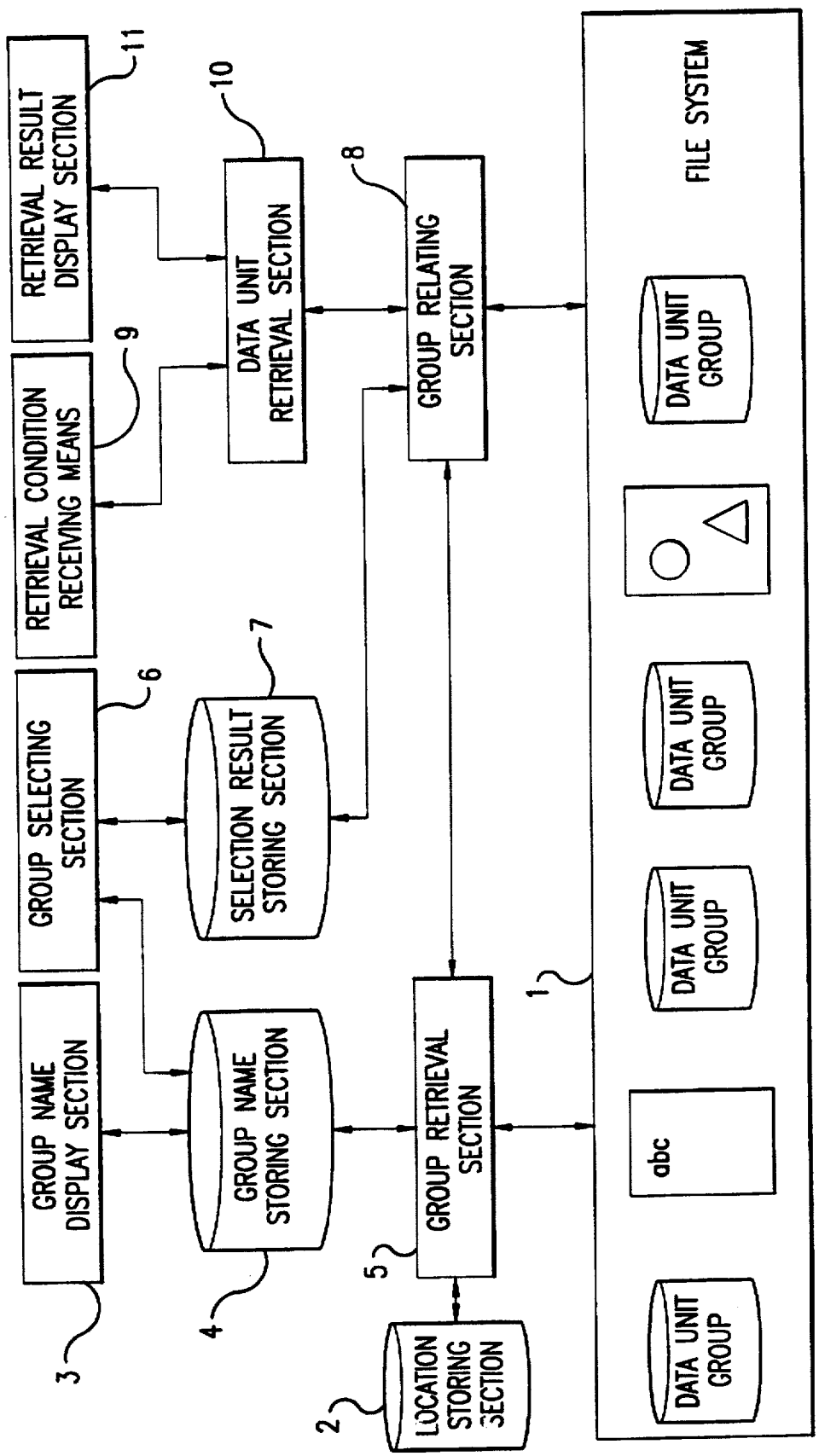
FIG. 1 is a block diagram illustrating the data unit group handling apparatus of the first embodiment according to the present invention.

FIG. 1 is a block diagram illustrative of the data unit group handling system of the first embodiment. FIG. 1 includes a file system 1, a location storing section 2, group name display section 3, group name storing section 4, group retrieval section 5, a group selecting section 6, a selection result storing section 7, a group relating section 8, a retrieval condition receiving section 9, a data unit retrieval section 10 and the retrieval result display section 11.

The group retrieval section 5 retrieves the data unit group available for this apparatus from the file system 1. The location storing section 2 stores a location where the data unit group exists and being referred in the retrieval procedure by the data unit group retrieval section 5. The group name storing section 4 stores the names of the data unit groups as the retrieval result retrieved by the group retrieval section 5. The group name display section 3 displays the names of the data unit groups stored in the group name storing section 4. The group selecting section 6 selects the data unit group to be searched from the data unit groups whose names are displayed by the group name display section 3. The selection result storing section 7 stores the names of the data unit groups selected by the group selecting section 6. The group relating section 8 to make a relational information which relates data unit groups stored in the selection result storing section 7 each other and stores the made relational information. The retrieval condition receiving section 9 receives a retrieval condition from a user. The data unit retrieval section 10 retrieves data units from the data unit groups related by the group relating section 8 in accordance with the retrieval condition received by the retrieval condition input section 9. And the retrieval result display section 11 displays the data unit retrieved by the data unit retrieval section 10.

Figure 2:
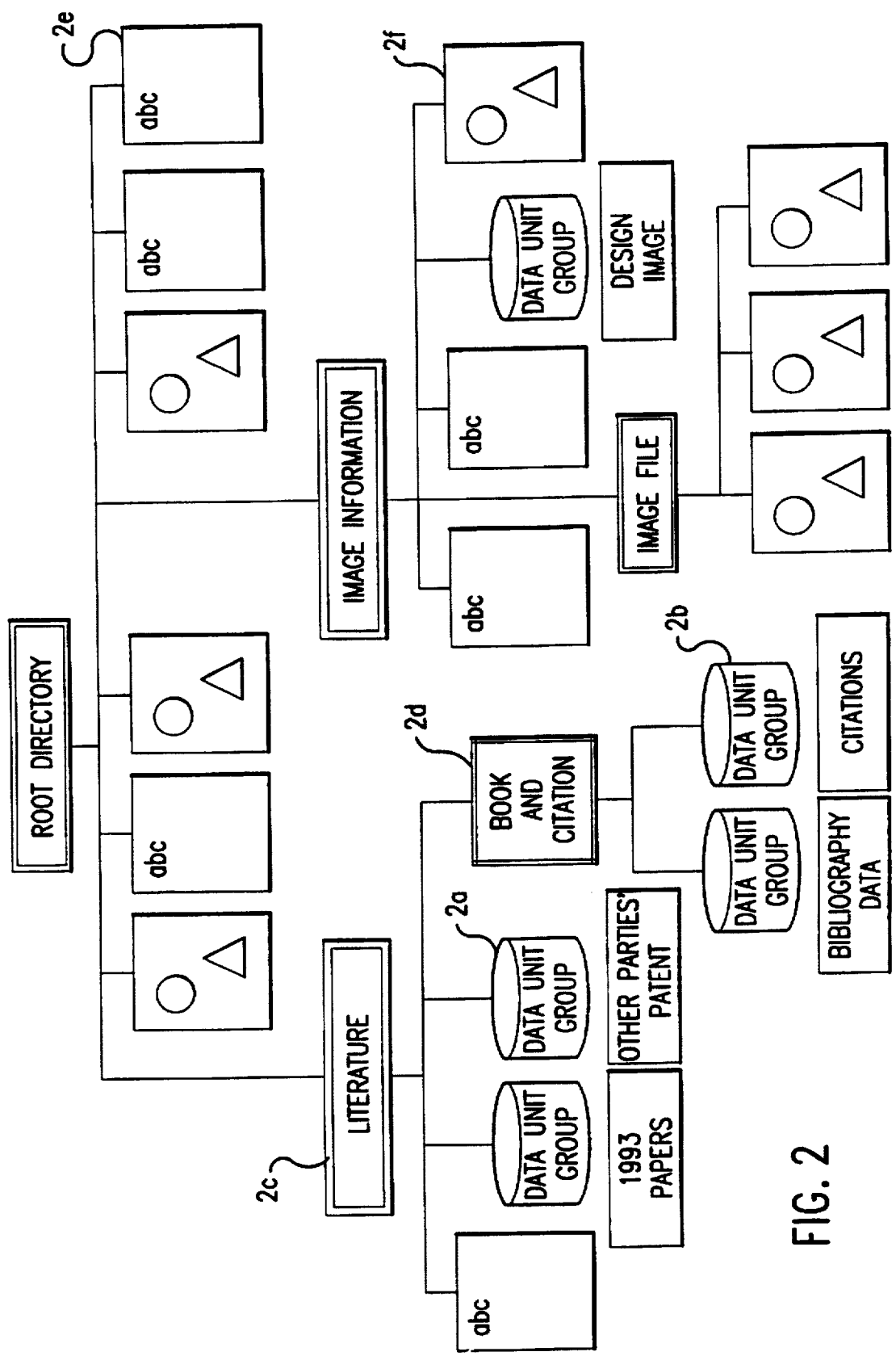
FIG. 2 shows an example of a file system targeted in the present invention.

FIG. 2 shows an example of the file system used by this invention. As shown in FIG. 2, the file system is managed by the directory structure, and data unit groups which are available on this apparatus, are scattered about among other unavailable files in the file system. Items accompanying the string "data unit group", such as 2a or 2b, are the data unit groups which are available in this apparatus. Items enclosed by double square, such as 2c or 2d, represent directory, and item in square, such as 2e or 2f, represents files including a document file or an image file. In the following, each of those items is equally called as a "file item". The file items can be connected directly with this apparatus, or can be connected through networks, because an art which a file system on the networks can be dealt with as if it were the file system of itself, is popular in these days.

Figure 3A:
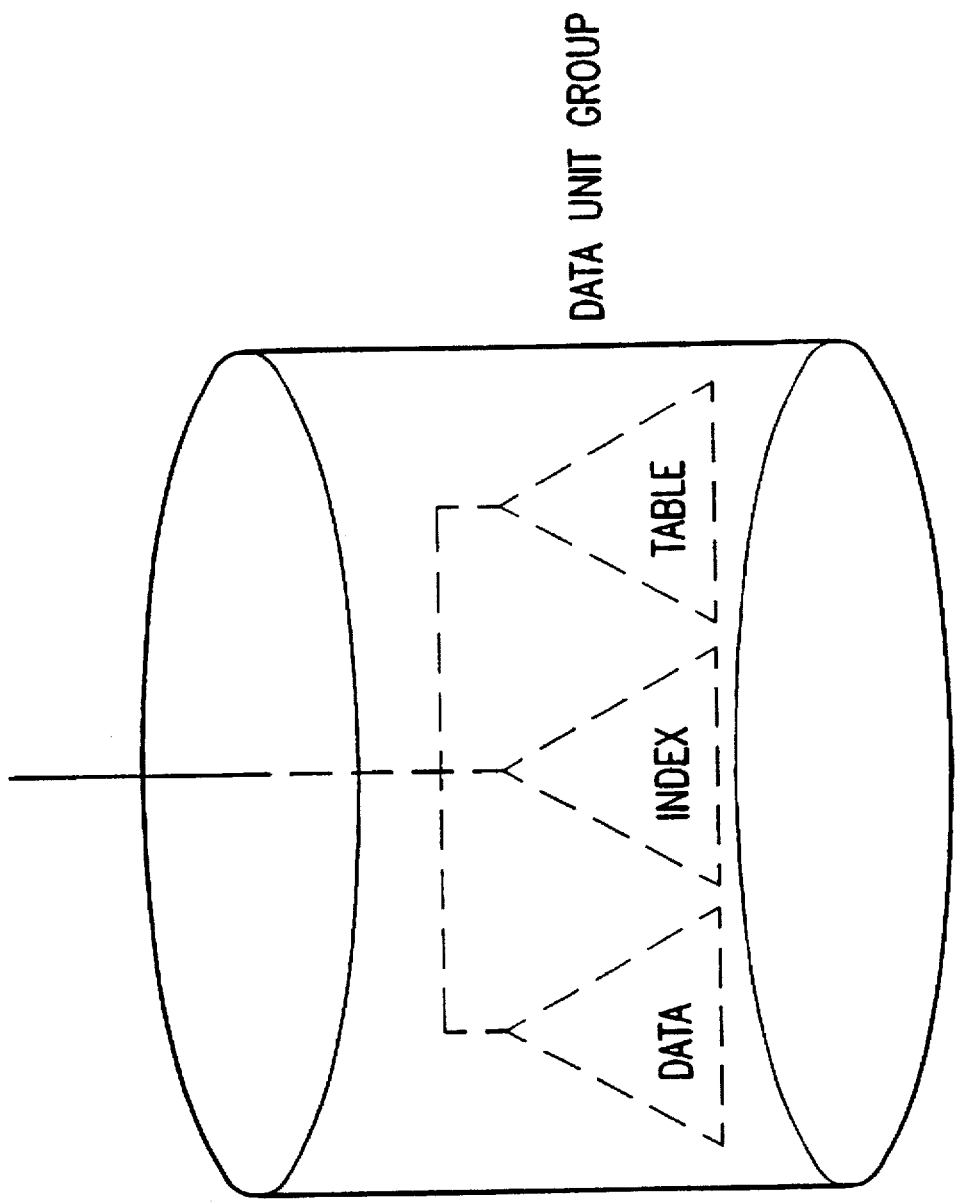

FIG. 3A shows an example of the structure of the data unit group in this embodiment. As shown in FIG. 3A, the file item as the data unit group which is available for this apparatus includes three file items (referred as a "subfile"), that is, "Data", "Index" and "Table". The "Data" is a set of the data units which is a pair of a head word and a data body corresponding to the head word. The "Index" and the "Table" are subfiles to accelerate the retrieval of the data unit. The subfile "Table" is prepared for converting a hash value calculated from the given retrieval key into an index address which points a location in the subfile "Index". The subfile "Index" is a hash table having lists of pairs of the retrieval key and a data address which points a data unit corresponding to the retrieval key in the subfile "Data". Each of the list is prepared for pointing the data units corresponding to one hash value. The index address stored in the subfile "Table" is a head address of the list. FIG. 3B shows an outline of the structure of the data unit group described above. For instance, when a string "parsley" is inputted as a retrieval key and it is assumed that its hash value is 1, at first an index address to point a head of one of the lists in the subfile "Index" corresponding to the hash value is picked up by referring the subfile "Table". In the next, a data address which points a data unit in the subfile "Data" is obtained by checking the list in the subfile "Index" which begins with the picked up index address one by one. Then data included in the data body of the data unit pointed by the data address is retrieved as retrieval result.

Figure 4:
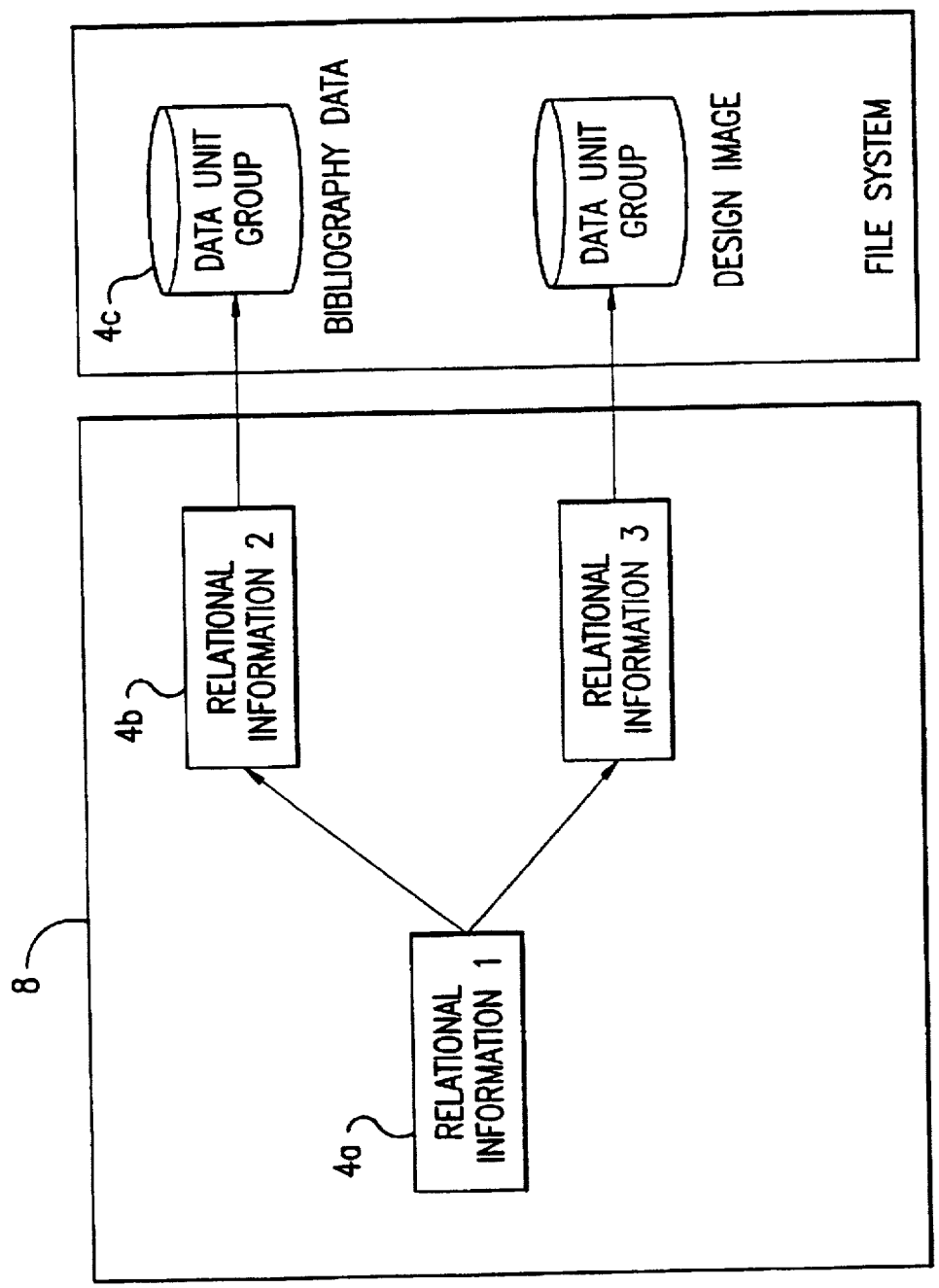
FIG. 4 is an example of a relational information stored in the data unit group relating section.

In the following, relational information which represents relation among data unit groups is stored in the group relating section 8. In the embodiment, the relation among data unit groups is defined by a binary tree. FIG. 4 shows a conceptual chart of the binary tree to relate the data unit groups one another. In this chart, 4c denotes a data unit group, 4a and 4b denotes the relational information. The relational information at the leaf of the binary tree is corresponding to the data unit group existing in the file system. The relational information except for the leaf points two its child relational information. If the two arcs of the relational information to point its child relational information have an order, the order of the whole of the binary tree to relate the data unit groups can be defined. Each relational information has a unique name. It is possible to store a plurality of the binary trees of relational information in the group relating section 8.

Figure 5:
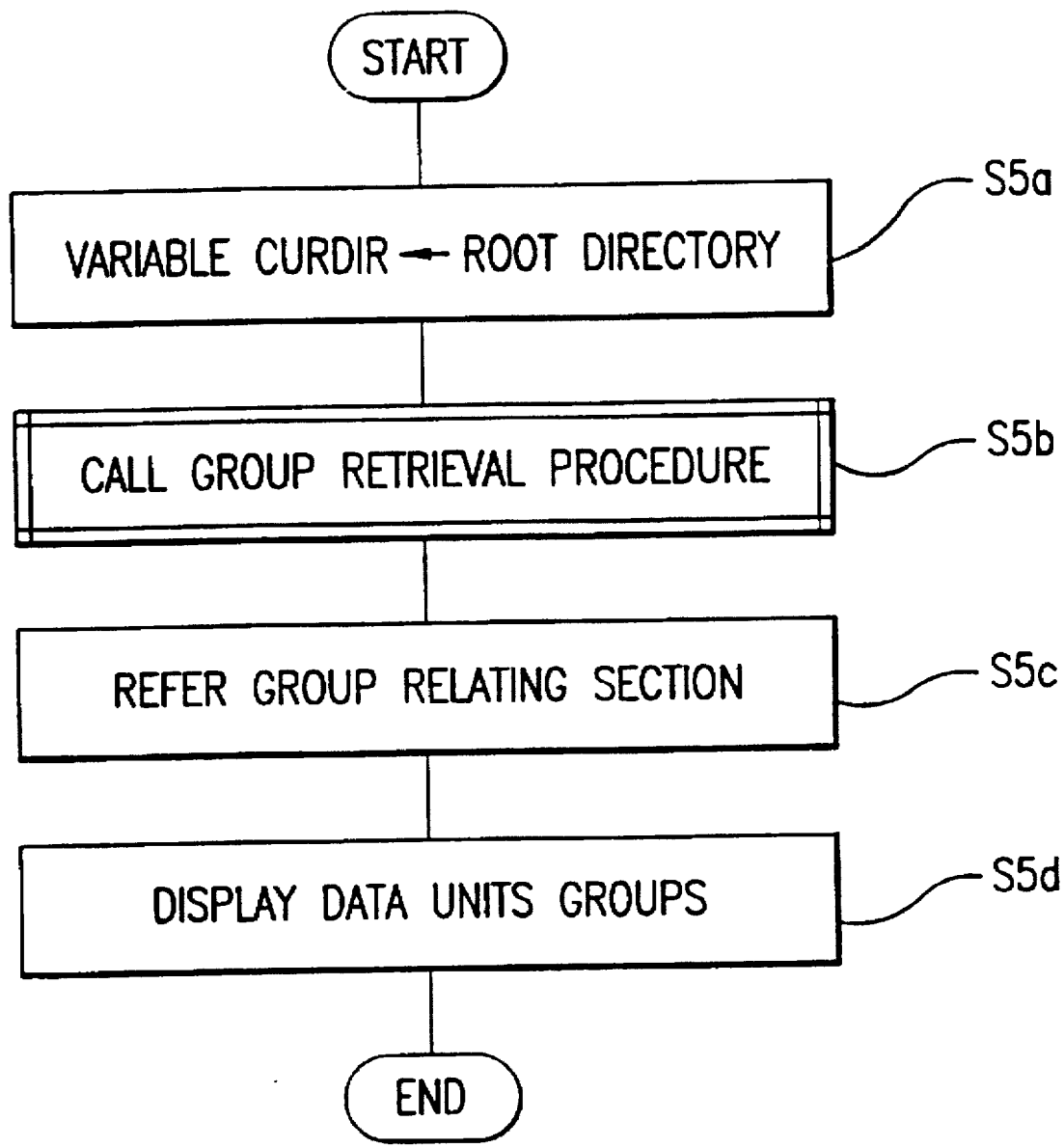
FIG. 5 is a flowchart illustrative of the procedure to check a whole file system and to retrieve the available data unit groups.
Figure 6:
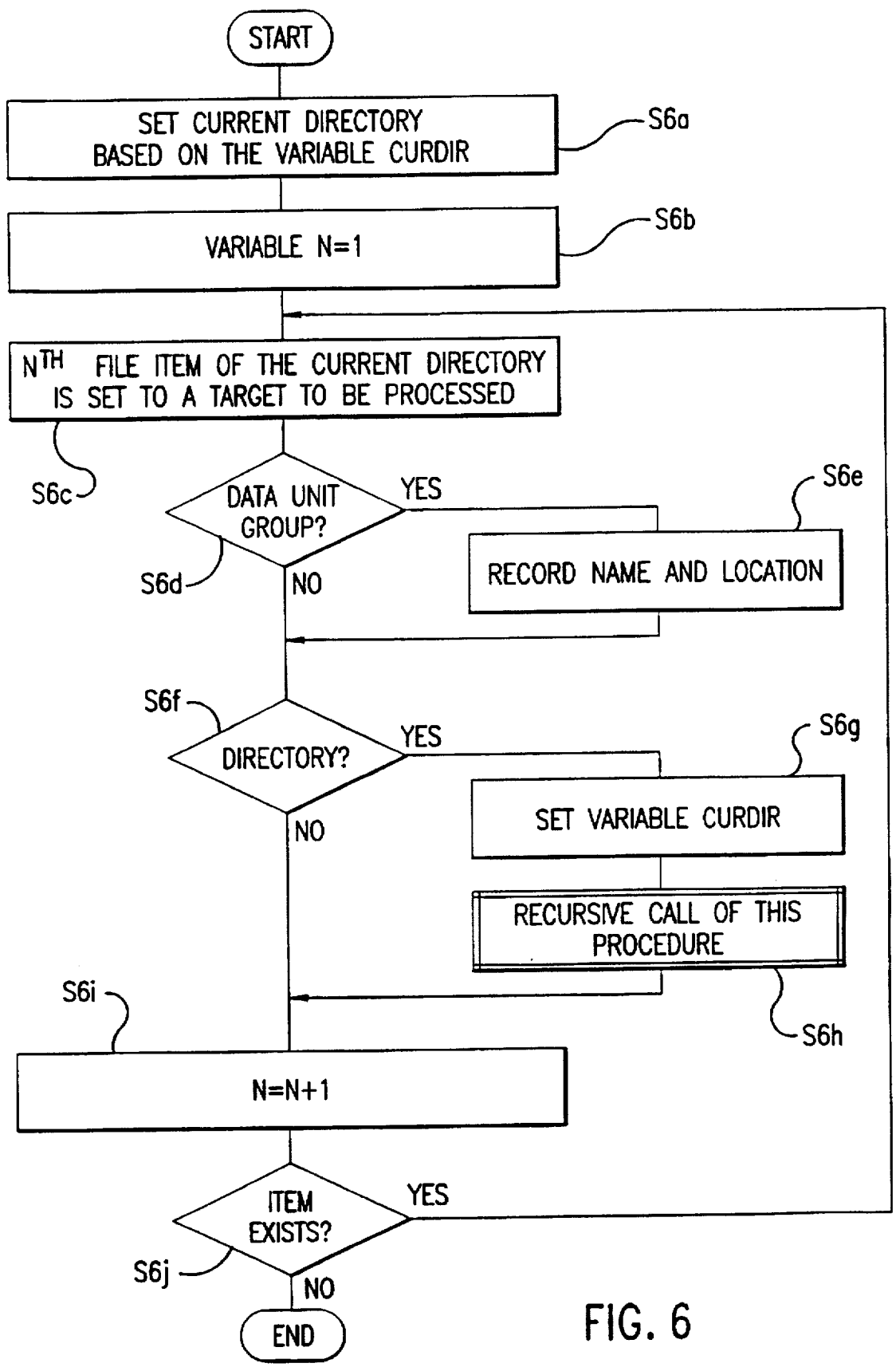
FIG. 6 is a flowchart illustrative of the procedure for step S5b in FIG. 5.

Referring to the flowcharts shown in FIG. 5 and FIG. 6, the flow of the procedure to check the whole file system in order to retrieve data unit groups available in this apparatus and then to list them up, is explained.

FIG. 5 shows the outline of this procedure. At first, the variable "CURDIR" which stores the current directory is set to the root directory (step S5a). Then the group retrieval procedure to retrieve the available data unit group in this apparatus, which is explained later by using FIG. 6, is called (step S5b). In the next step, the group relating section 8 is referred (step S5c). In the end, after the group name display section 3 lists up the names of the data unit groups retrieved in step S5b, this procedure terminates (step S5d).

Figure 9:
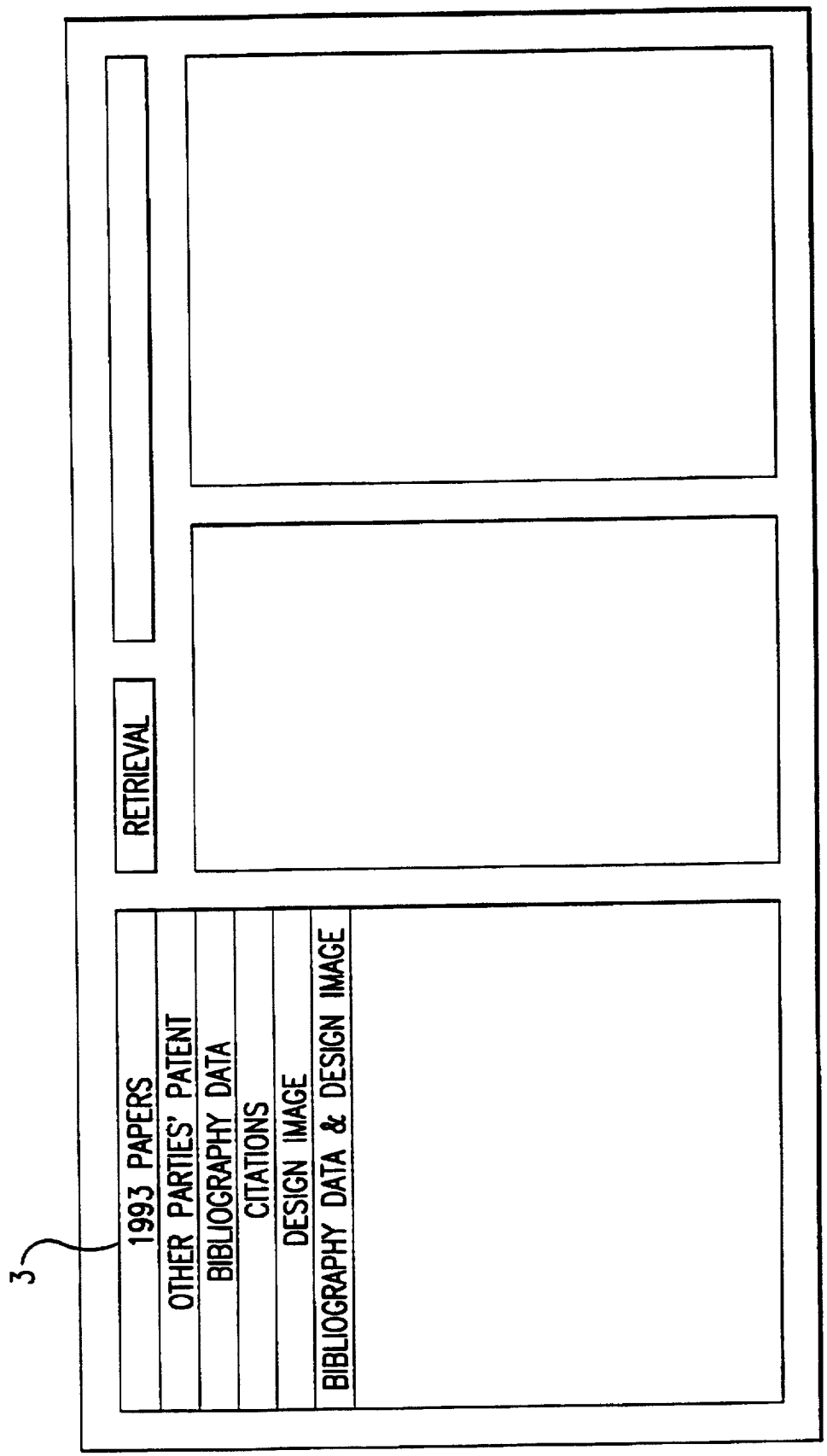
FIG. 9 is an example showing the display the names of the available data unit groups.

FIG. 9 is an example showing the display status which the names of the data unit groups are listed up by the group name display section 3. The listed names from the "1993 papers" to the "design image" are the names of the data unit groups which is actually existing in the file system. And the name "bibliography data+design image" is a name to identify the relational information stored in the group relating section 8.

FIG. 6 shows the flowchart illustrative of the group retrieval procedure to retrieve the data unit group which is available for this apparatus called in step S5b of FIG. 5. At the beginning, the current directory is determined in accordance with the value stored in the variable CURDIR (step S6a). Then the variable N which stores the value representing the order of the file item, is assigned 1 (step S6a). In the procedure hereinafter, the no. N file item is determined as the target to be processed (step S6c). In the next step, it is checked whether the no. N file item is the available data unit group in this apparatus or not by the procedure described later (step S6d). If the file item is determined as the available data unit group, the name and the existing position of the file item is added to the group name storing section 4 (step S6e). To be more concrete, the name of the data unit group is obtained by reading the unique name of the file item, and the existing position is determined by the value of variable CURDIR. For example, in FIG. 2, the data unit groups 2a and 2b are named in advance "outline of the patent of other companies" and "citations", respectively. Next, it is checked whether a file item exists in the lower layer of the no. N file item or not (step S6f). If there is a file item under the no. N file item, the no. N file item is assigned to variable CURDIR (step S6g). Then, the procedure shown in FIG. 6 is recursively called (step S6h). In the next, after variable CURDIR is incremented (step S6i), as far as the no. N file item exists (step S6j), the procedure from step S6c to step S6i is repeated.

This procedure terminates when there is no more file item which is not checked in the current directory of variable CURDIR. Then, when the procedure which the root directory is assigned to the variable CURDIR terminates, the control of the procedure is returned to the procedure shown in the flowchart in FIG. 5. At that time, the group name storing section 4 has all of the group names of the data unit group which is available in this apparatus. FIG. 8A shows an example of the data stored in the group name storing section after the group retrieval procedure terminates.

Figure 7:
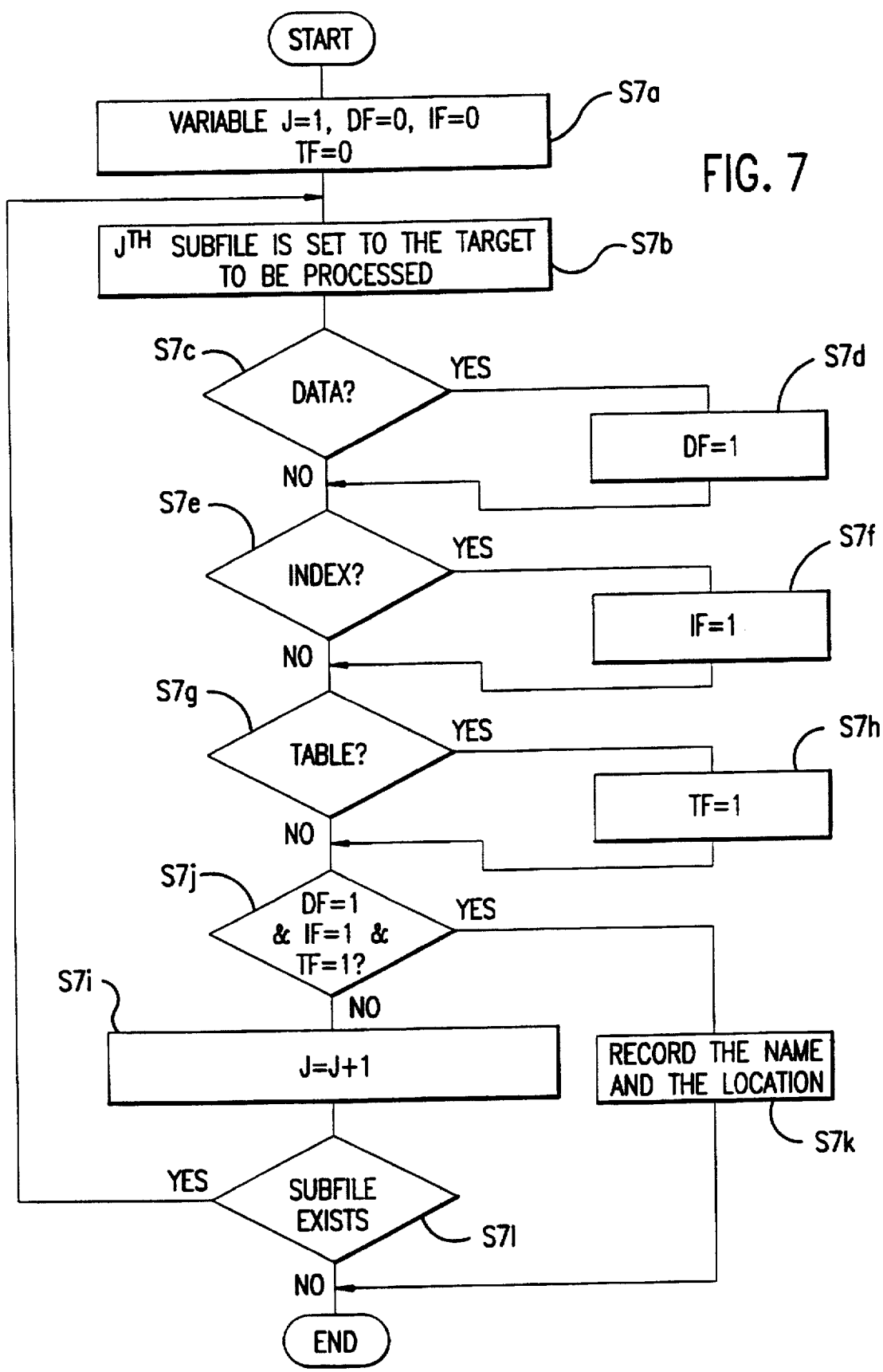
FIG. 7 is a flowchart of the procedure to determine whether a file item is available for this system or not.

FIG. 7 shows an example of a flowchart illustrative of a detailed procedure in the steps S6d and S6e in FIG. 6 to check whether the file item is available or not in this apparatus. As shown in FIG. 3, the structure of the data unit group which is available in the apparatus of this embodiment is a directory including three subfiles, that is, "Data", "Index" and "Table", under the file item. For this reason, if a file item has these three subfiles, the file item can be determined as the data unit group which is available in this apparatus.

At first, the variable J, which represent the order of the subfile at the lower layer of the noted file item, is set 1. Further, flags DF, IF and TF, which represent the existence of the subfiles "Data", "Index" and "Table" respectively, are initialized 0 (step S7a). In the procedure hereinafter, the no. J subfile is determined as the target to be processed (step S7b). Whether the no. J subfile is "Data" or not is checked (step S7c). If it is "Data", the flag DF is set 1 (step S7d). In the same manner, whether the subfile is "Index" or not is checked (step S7e), and the subfile is "Table" or not is checked (step S7g). If it is "Index", the flag IF is set 1 (step S7f), and if it is "Table", the flag TF is set 1 (step S7h). The checks for these three subfiles can be in any order. Next, whether all these flags DF, IF and TF are set to 1 or not is checked (step S7j). If all those flags are 1, the noted file item is determined as the available data unit group in this apparatus, and the name of the file item and the location where the file item exists are registered to the group name storing section 4 (step S7k), then this procedure terminates. If at least one of the flags is not set 1, the variable J is incremented (step S7i). As far as the next subfile exists, the procedure from step S7b to step S7i are repeated (step S7l). When there is no rest of the subfile before all three flags are set 1, the noted file item is not determined as the available data unit group in this apparatus, then this procedure terminates There are some other checking method for the data unit group. For example, the simplest method defines the form of the name of the available data unit group in this apparatus, such as "XXX.DAT", and checks whether the name of the file item is fitting for this form. Further, some file system can define a file type for each of the file items. The file type represents which application can use the file item. In such a file system, the check of the file type is corresponding to the check of the data unit group. If more exact check is required, it is possible that the file item is once opened as the target of the search and is tried to retrieve a specified data unit from the target file item to check whether it can be retrieved. In this case, it is possible to try to retrieve the management data unit which is included commonly in all of the data unit group. The management data unit is retrieved by the unique key which cannot be inputted by using keyboard from a user. If a check for the basic operation to the target file item is required, it is possible to prepare dummy data unit, register the dummy data unit to the target file item, retrieve it update it, and then delete it. If these operation ends successfully, this apparatus determines this file item as a valid file item.

Figure 10:
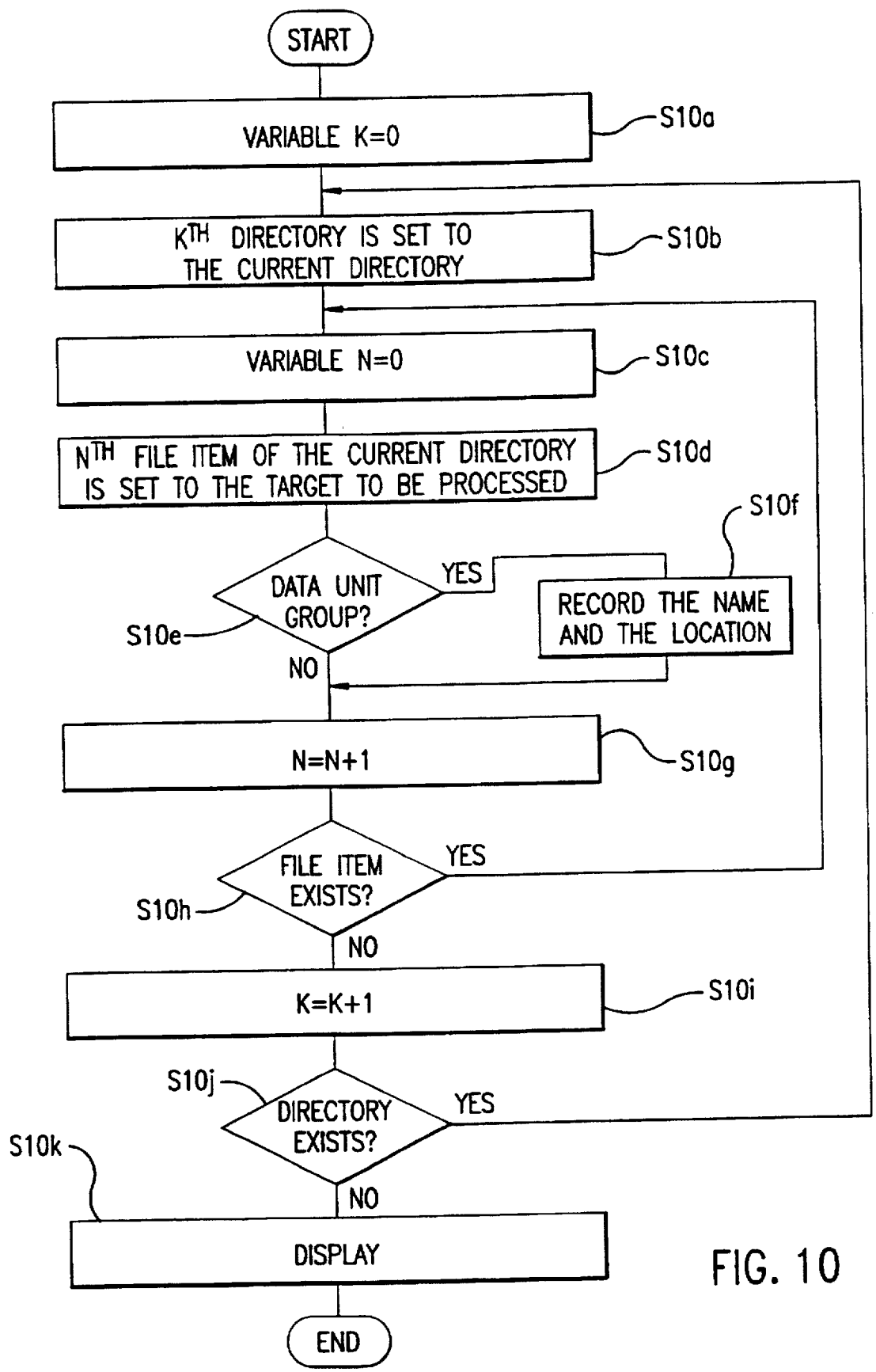
FIG. 10 is a flowchart of the procedure to retrieve the available data unit groups under the designated directories.

In the procedure described above, the procedure to retrieve the data unit groups is executed for the whole of the file system. But this is sometimes too time consuming procedure, when the file system becomes too broad. The location storing section 12 is provided to limit the area for the retrieval of the data unit groups. FIG. 12 shows an example of data stored in the location storing section 12. The location storing section 12 defines in advance the name of the directory where must be searched in the data unit group retrieval procedure. FIG. 10 shows a flowchart of the data unit group retrieval procedure including the limit of the search area in the file system.

In FIG. 10, at the beginning, variable K is set to 0 (step S10a). Next, the no. K directory stored in the location storing section 2 is read and assigned to the current directory (step S10b). Then, variable N is set to 0 (step S10c), the no. N file item in the lower layer of the current directory is determined as the target to be processed (step S10d). In the next step, whether this file item is the available data unit group in this apparatus or not is checked (step S10e), then if so, the name of the file item is stored to the group name storing section 4 (step S10f). While variable N is incremented one by one (step S10g), procedure from step S10c to step S10g is repeated until no file item left (step S10h). Next, while variable K is incremented one by one (step S10i), and procedure from step S10b to step S10i is repeated until no directory left in the location storing section 2 (step S10j). At the end of the procedure, after the group name display section 3 lists up the names of the available data unit group, this procedure terminates (step S10k).

In the procedure shown in FIG. 10, only one layer of the defined directory is checked. But it is also possible to check all lower layers under the defined directory recursively. In this case, the procedure shown in the flowchart of the FIG. 6 can be used by starting from the defined directory instead of the root directory. To avoid the double registration of the retrieved data unit group, the name of the file item is registered after the checking whether the same name has already existed in the group name storing section 4, or one of the double registered name is eliminated from the group name storing section 4 by the post processing.

In the following, the detailed procedure to refer the group relating section 8 of step S5c in FIG. 5 is explained. At the beginning, one of the relational information corresponding to the root node of the binary tree for the relational information stored in the group relating section 8 is selected and the processing shown in FIG. 11 starts.

At first, the current relational information is set. For the starting point, the relational information corresponding to the selected root node is set to it (step S11a). The name and the address of the current relational information are temporally registered (step S11b). In the next step, variable N which represents the order of the child relational information of the current relational information is set 0 (step S11c). The no. N child relational information is determined as the target to be processed (step S11d). Whether this target relational information is the leaf of the binary tree is checked, and if so, whether the data unit group corresponding to the leaf relational information exists is further checked. The method for checking the existence of the data unit group is, for example, to check whether the name which is equal to the name of the data unit group corresponding to the leaf relational information, is stored in the group name storing section or not (step S11f). If the data unit group does not exist, temporally registered name of the relational information is cleared, then this procedure started from the root relational information is terminated (step S11g). If the relational information is not a leaf of the binary tree in the step S11e, the relational information is assigned to the current directory (step S11h), then this procedure is recursively called (step S11g). After the control of the procedure is returned from the recursively called procedure, variable N is incremented (step S11j), if the variable N is less than 2, the procedure is repeated from step S11d, otherwise this procedure terminates (step S11k).

Figure 11:
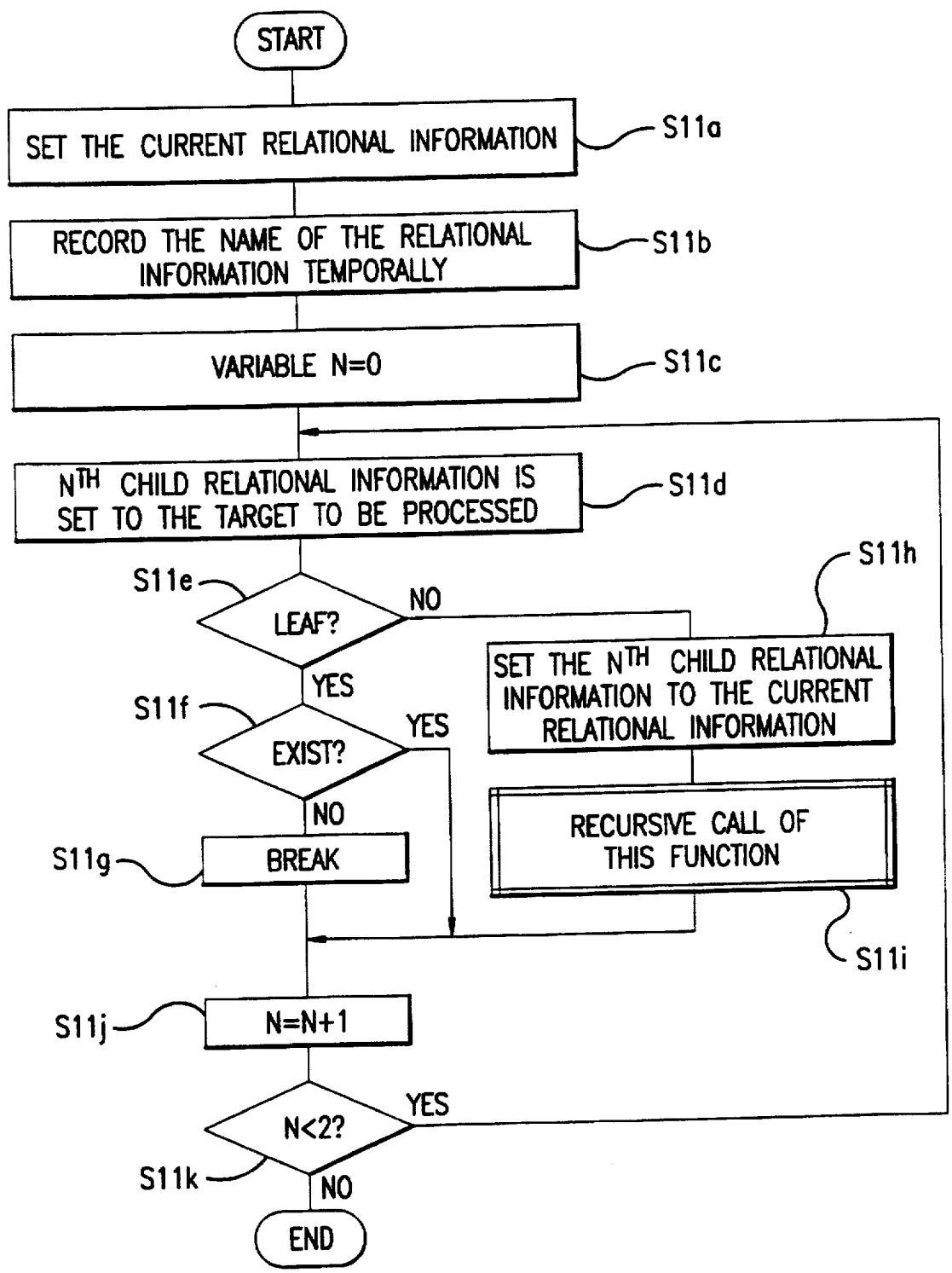
FIG. 11 is a flowchart of the procedure to retrieve the relational information.

When this procedure started from one of the root relational information terminates, the names and the addresses of the relational information temporally stored are transferred to the group name storing section. Then, as far as the root relational information exists the procedure of FIG. 11 is repeated. FIG. 8B shows an example of the data condition of the group name storing section 4 after the procedure of the flowchart shown in FIG. 5 is finished. In FIG. 8B, a pair of the name "bibliography data+design image" and the existing location "information relation 1" is added.

The procedure shown in FIG. 5 extracts all of the relational information corresponding to the all nodes of the binary tree. But it sometimes causes the complexity, because too many nodes for the relational information are extracted. For this reason, for instance, it is also possible to extract only the relational information corresponding to the root node of the binary tree. In this case, it is not required to create the binary tree to relate the data unit groups one another. The list structure can be used instead. Further, it is also possible that a user instructs whether the procedure of step S5c in FIG. 5 executes or not. Since the procedure of the steps S11f and S11g detects the data unit group which has been once related and then already has been deleted, and does not display it, the invalid data unit group is not determined as the target to be processed. Further, when the relational information including the eliminated data unit group is detected, it can be automatically deleted.

In the following, the procedure to select the data unit group or the relational information to be processed from the data unit group or relational information which are displayed in form of the list as shown in FIG. 9. A "item" represents the data unit group or the relational information in the explanation of the procedure hereinafter.

Figure 13:
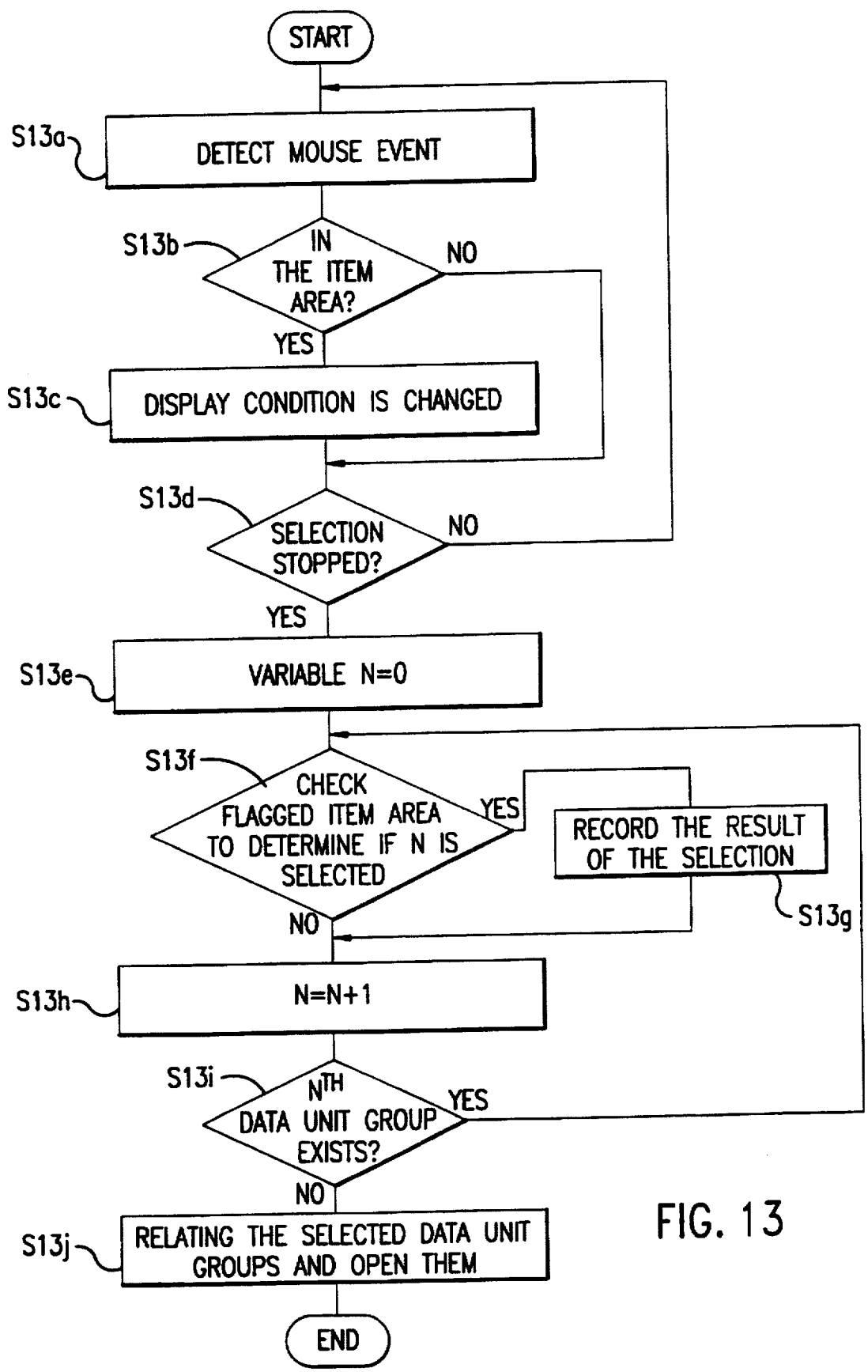
FIG. 13 is a flowchart of the procedure to select data unit groups without ordering.

FIG. 13 shows a flowchart of the procedure to select the items excluding the record of the order of the selection. In this procedure, a plurality of the items can be selected simultaneously, that is to say, a plurality of the data unit group are selected simultaneously. But the order of the selection is not recorded, it is impossible to combine a plurality of the data unit groups with ordering. In this embodiment, the names of items are displayed and in the same time these displays items worked as buttons to receive the user's selection of items by mouse clicking.

Figure 14:
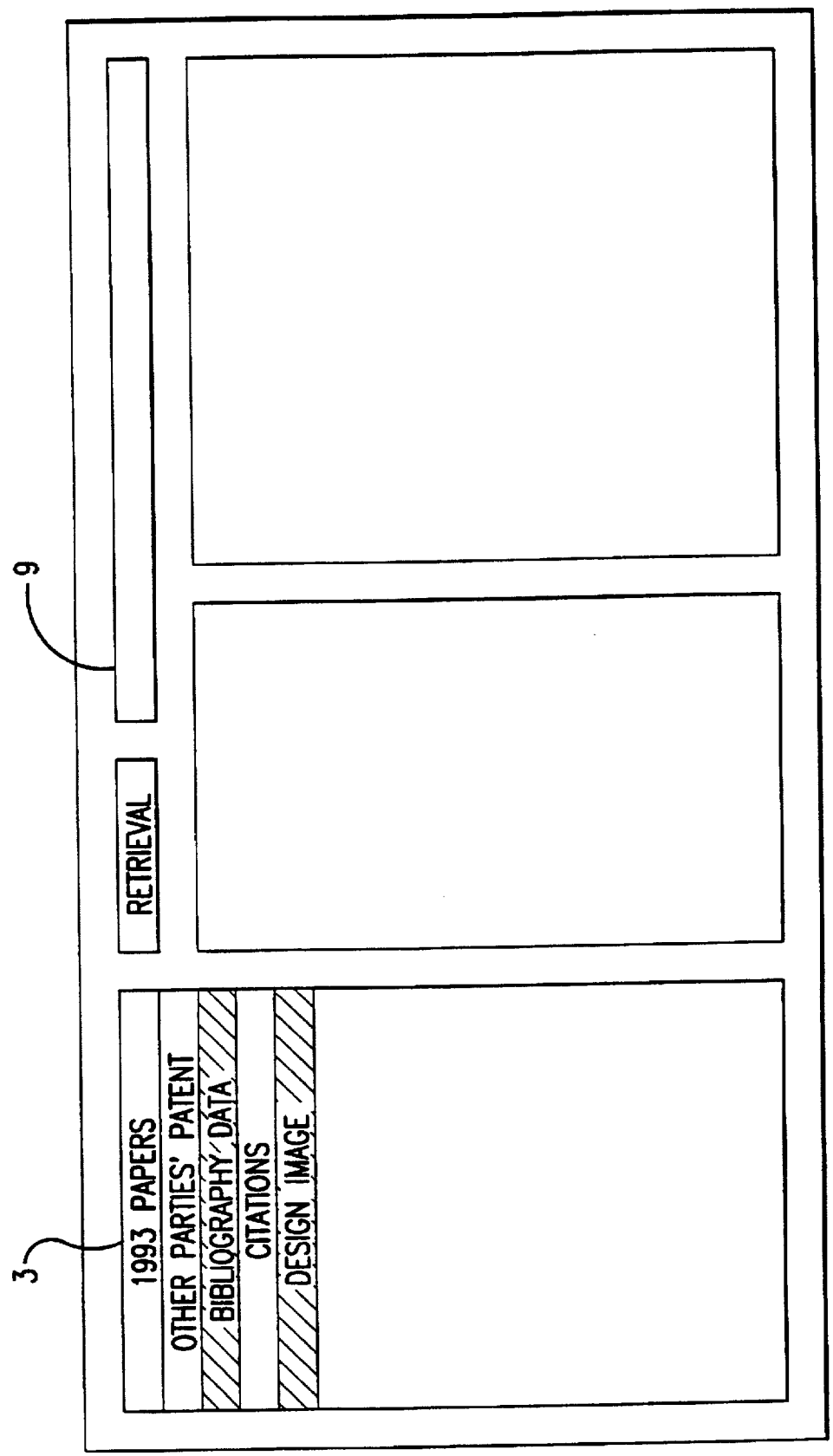
FIG. 14 is an example showing the display after the data unit groups selected.

At first, a mouse event is detected (step S13a), and it is checked whether it happens in the item area where is displayed the name of one of the items (step S13b). If it happens in the item area, the display condition is changed to enable the user to identify the selected item. In this embodiment, the selected item area is shaded as shown in FIG. 14. A flag is assigned for each of the item areas and the flag for the shaded item area is set (step S13c). And until the selecting operation is stopped, the procedure from step S13a to step S13c is repeated (step S13d).

In the next step of the procedure, the selected items are recorded. At first, the variable N is set 0 (step S13e), then the flag for the no. N item area is checked to determine whether the no. N item in the list stored in the group name storing section 4 is selected or not (step S13f). If it is selected, the name and the existing location of the selected item, are registered in the selection result storing section 7 as a selecting result (step S13g). FIG. 15 shows an example illustrative of the storing condition of the selection result storing section 7. While variable N is incremented one by one (step S13h), the procedure from step S13f to step S13h is repeated by the last item (step S13i). At the end of this procedure, the group relating section 8 relates more than one data unit groups in accordance with the selecting result stored in the selection result storing section 7, then the data unit groups to be processed are opened one by one based on the relating result (step S13j). Here, "open" means that the data unit group is set a status to be processed.

In this embodiment, the group relating section 8 creates a binary tree in accordance with the data unit group or the relational information stored in the selection result storing section 7. At first, as initializations, the data unit group or the relational information is picked up from the top of the the list stored in the selection result storing section 7. When it is the data unit group, a new relational information to refer the data unit group, such as a pointer to point the data unit group, is generated. Here, this relational information is referred as the designated relational information A. When it is the relational information, the relational information is set to the designated relational information A. Next, another data unit group or the relational information is picked up from the next top of the list stored in the selection result storing section 7. In the same manner as the designated relational information A, if that is the data unit group, another new relational information is further generated to refer the data unit group. Here, this relational information is referred as the designated relational information B. If it is the relational information, then the relational information is set to the designated relational information B. When the designated relational information A and B are ready, a new relational information which refers to both of the designated relational information A and B is generated, and the generated relational information is newly set to the designated relational information A. Then the procedure is repeated from the determination of the designated relational information B until the list in the selection result storing section 7 comes to end. In the data unit retrieval procedure or analyzing procedure later described, the procedure starts with the relational information corresponding to a root node of the generated binary tree.

Figure 16:
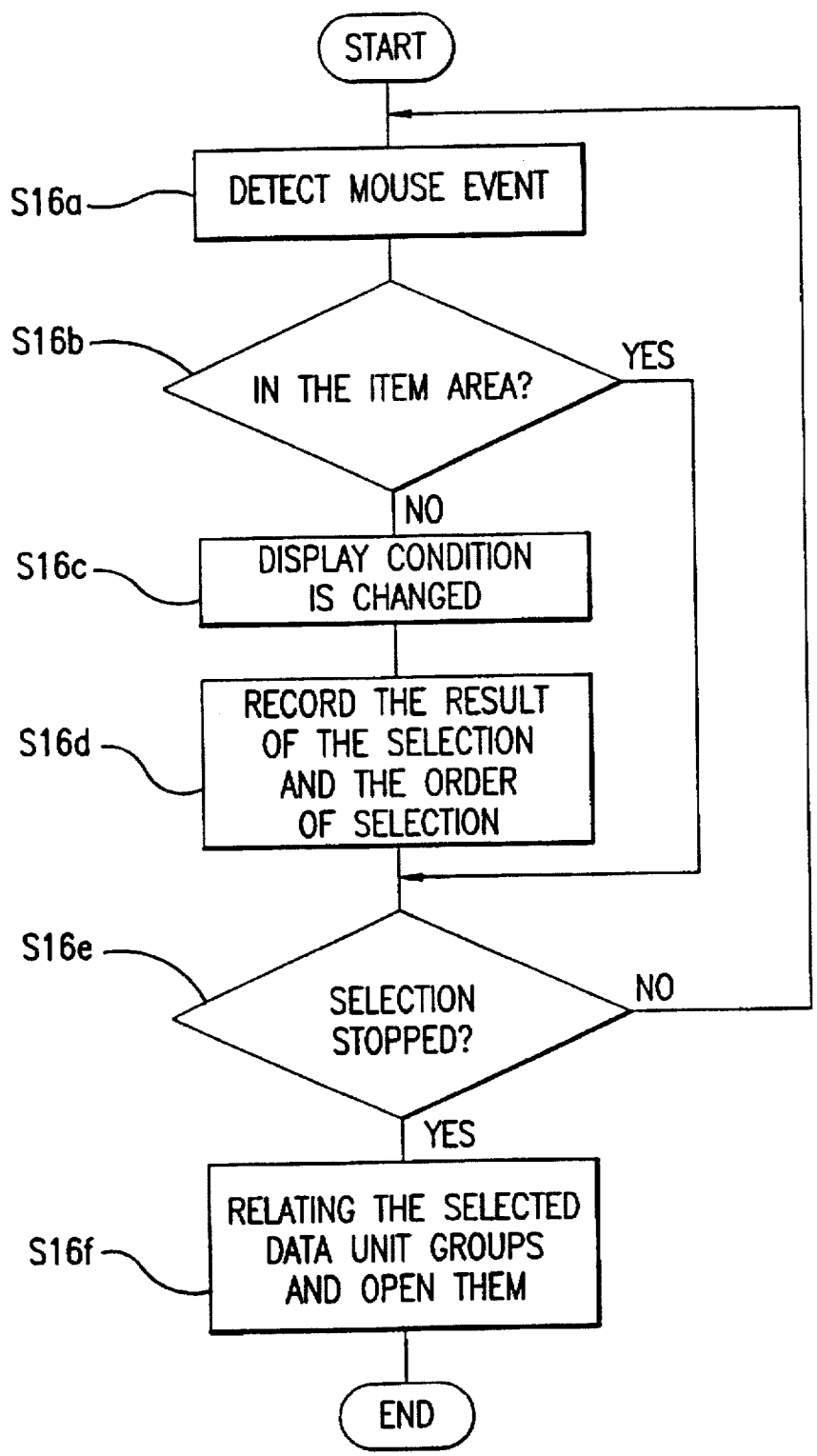
FIG. 16 is a flowchart of the procedure to select the data unit group with ordering.

FIG. 16 shows a flowchart of the procedure to select the items including the record of the order of the selection executed by the group selecting section 6. According to this procedure, a plurality of the data unit groups can be selected simultaneously or can be combined with ordering.

At first, a mouse event is detected (step S16a), and it is checked whether it happens in the item area which is displayed the name of one of the items (step S16b). If it happens in the item area, the display condition is changed to enable the user to identify the selected item. In this embodiment, the selected item area is shaded as shown in FIG. 14 (step S16c). In the same time, the order of the selection, the name and the storing location of the selected item are recorded in the selection result storing section 7 as a selecting result (step S16d). FIG. 17 shows an example of the storing condition of the selection result storing section 17. Until the selecting operation is stopped, the procedure from step S16a to step S16d is repeated (step S16e). In the end, the group relating section 8 relates more than one data unit groups in accordance with the selecting result stored in the selection result storing section 7 and then the data unit groups to be processed are opened one by one according to the order of the selection (step 16f).

In this embodiment, because the order of the selection is recorded, the data unit groups can be opened using this order. To be more concrete, when a search key is inputted from a user, the first data unit group is searched using the search key to retrieve the data unit as the retrieval result, then the second data unit group is searched using the retrieval result as a search key. In the relating procedure using the binary tree described before, the binary tree is created so as to keep the order of the selection. For instance, during the binary tree is being created, the designated relational information A is assigned order 1 and the designated relational information is assigned order 2, to determine the order of the all nodes of the binary tree.

The procedure to retrieve the data unit from the opened data unit group is described here. In this embodiment, a plurality of the data unit groups are related each other in a form of the binary tree so that a user can deal with them as if they were a data unit group by the group relating section 8 as described above.

Figure 18:
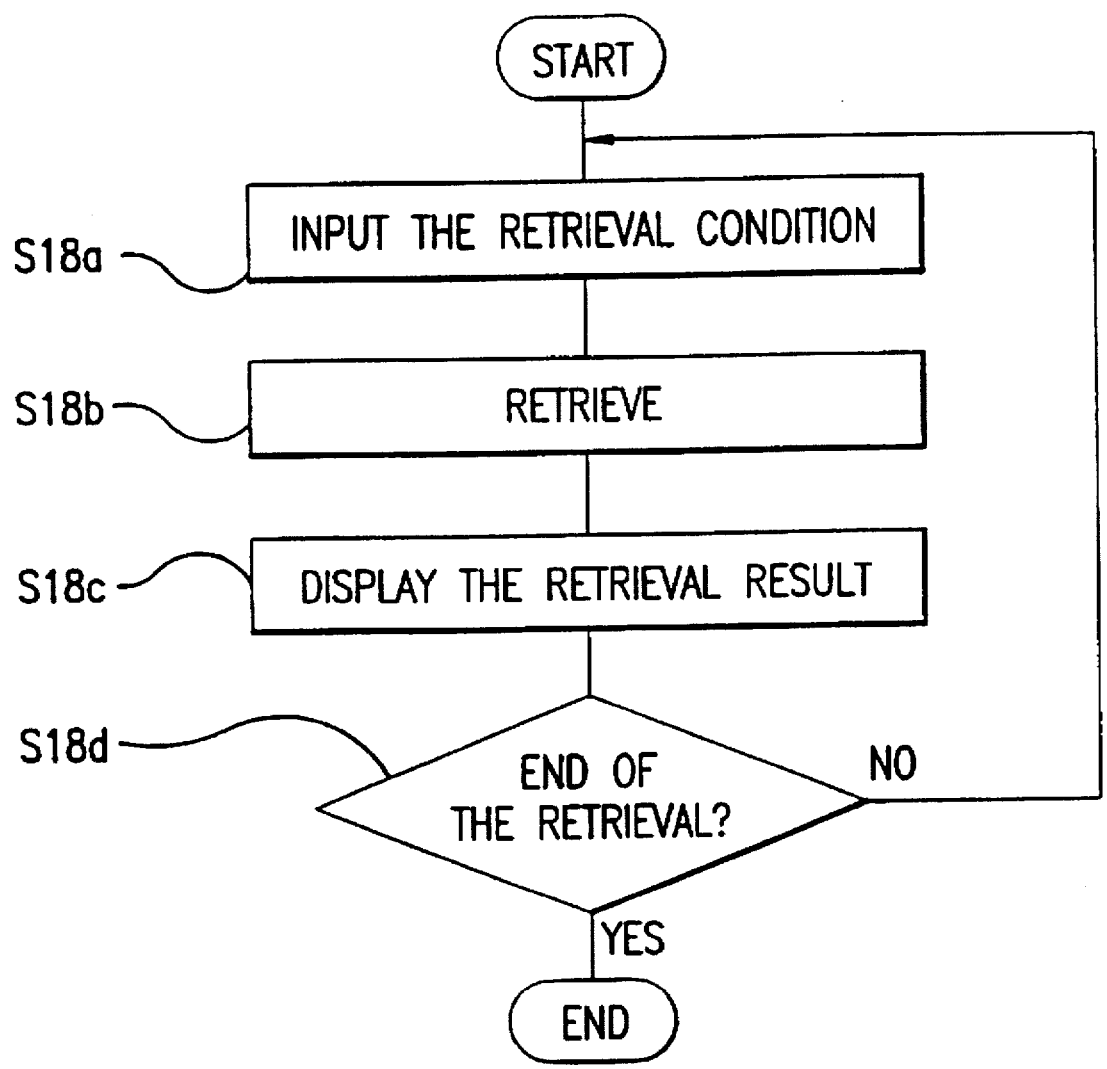
FIG. 18 is a flowchart of the procedure to retrieve data units from the selected data unit groups without ordering.
Figure 20:
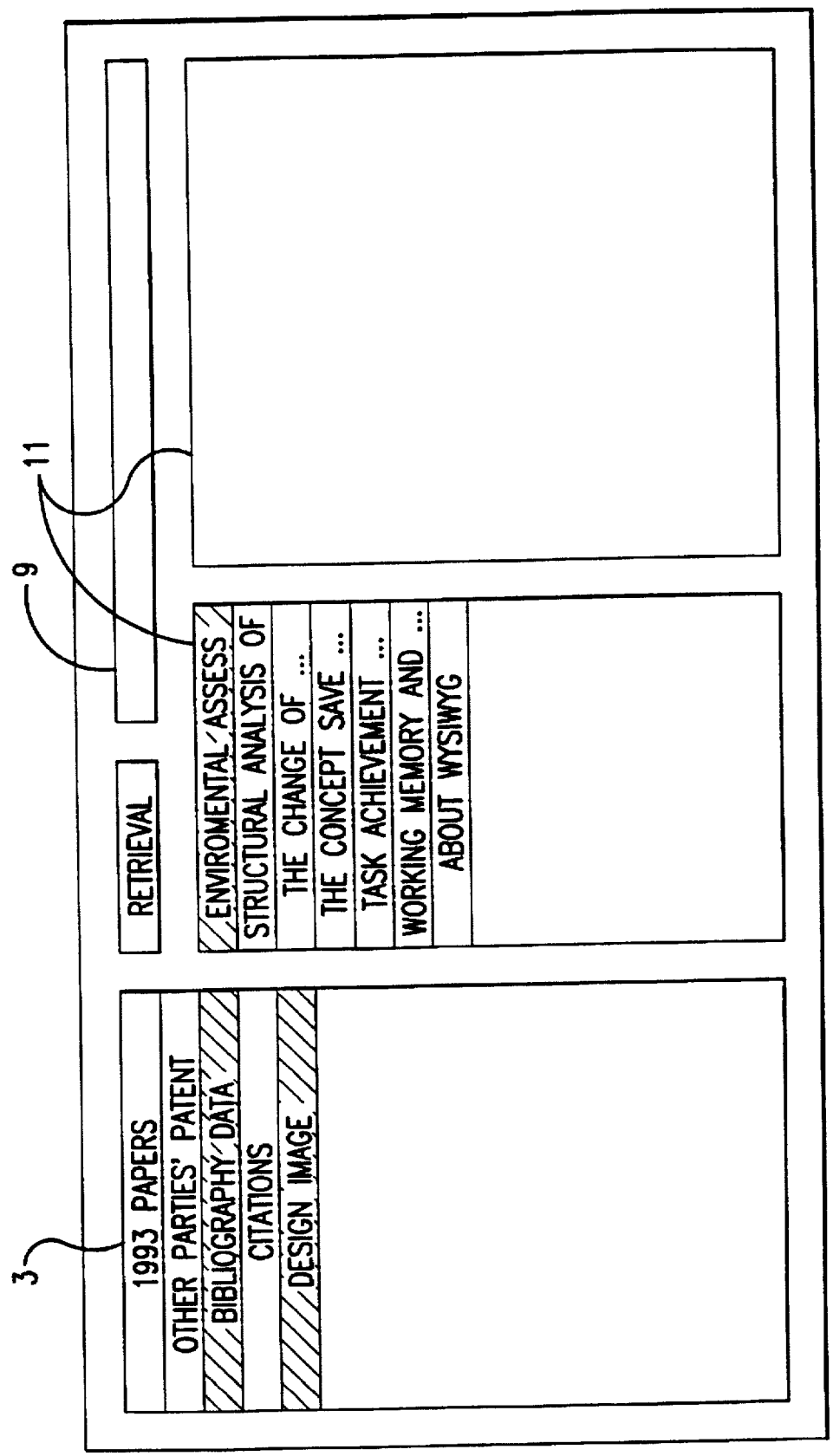
FIG. 20 is an example showing the display of the head words of the retrieved data units.
Figure 21:
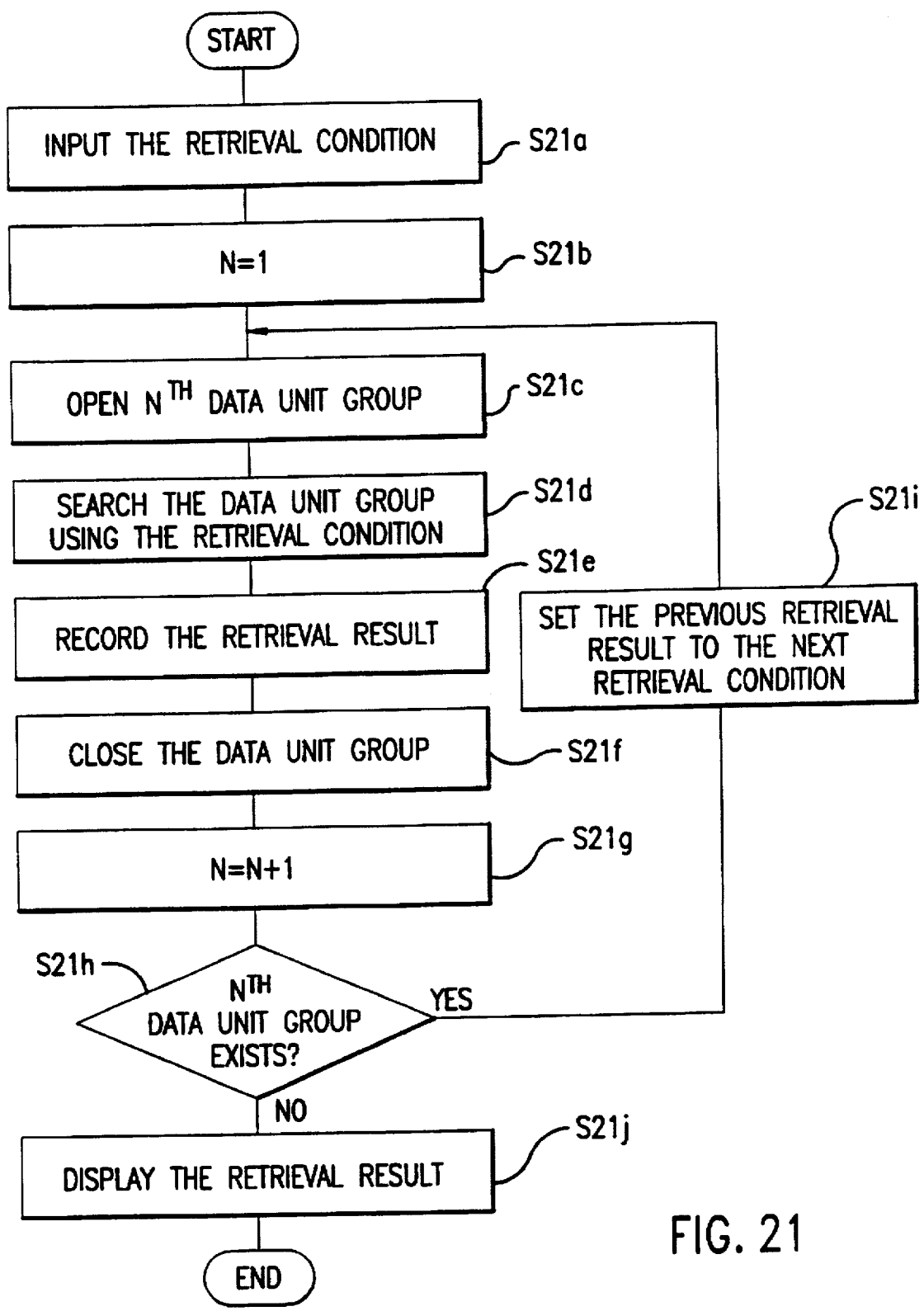
FIG. 21 is a flowchart of the procedure to retrieve data units from the selected data unit groups with ordering.

FIG. 18 is a flowchart of the data unit retrieval procedure to retrieve the data unit. At first, a user inputs a retrieval condition through the retrieval condition inputting section 9. In this embodiment, the data units are retrieved by the keywords attached to each of the data unit. So the user inputs a search key as a retrieval condition (step S18a). Instead of the keyword retrieval used here, other retrieval method, such as the full-text retrieval, can be used without any change for the outline of the function or the flow of this procedure. The data unit retrieval section 10 retrieves the data units having a keyword corresponding to the input search key to get retrieval result as shown in FIG. 19 from a plurality of the data unit groups which are related one another (step S18b). In this embodiment, the name of the data unit corresponding to the retrieval condition, the group name of the data unit group which includes the retrieved data unit, and the existing location of the data unit in the file system are included in the retrieval result. Then, the name of the retrieved data units are displayed in a form of a list as shown in FIG. 20 in accordance with the retrieval result by the retrieval result display section 11 (step S18c). Until the instruction to stop the retrieval is input by the user, this procedure is repeated (step S18d).

In the detailed procedure of step S18b in FIG. 18, the binary tree for the relational information which is created as described before is traced from the root node one by one, and the data unit group corresponding to the traced leaf relational information of the binary tree is determined as the target for searching to retrieve the data units. The binary tree to relate the date unit groups one another, is left after the end of the retrieval procedure, except that the tree is created by only one node. As described above, if the relational information corresponding to the nodes of the binary tree can be designated as the target to be searched, a plurality of the data unit groups existing under the designated relational information can be searched or analyzed as it were a only one data unit group. Consequently, there is merit that a plurality of the data unit groups are related at any time without an independent procedure or user interface for managing the existence status of the data unit groups. It is also possible to provide the command to store the binary tree only when it is needed.

When the relational information which relates the data unit groups one another are not used thereafter, the group relating section 8 is not required to have the function to create the binary tree. It is possible that the group relating section 8 refers the selecting result of the selection result storing section 7, and opens and searches the data unit group one after another.

In the following, an example for continuous search of the data unit groups using the order of the selection is explained. FIG. 12 is a flowchart of the data unit retrieval procedure including the order of the data unit groups in case that the binary tree is not created. At first, the retrieval condition is inputted (step S21a). Next, variable N which represents the order of the selection is set to 1 (step S21b). The no. N data unit group is opened (step S21c). The data unit is retrieved as the retrieval result from the opened data unit group using the retrieval condition (step S21d), and the retrieval result is stored (step S21e). The data unit group is closed after the retrieval (step S21f). Then, variable N is incremented (step S21g). If the next data unit group exists (step S21h), the retrieval result retrieved from the previous data unit group is set to the retrieval condition for the next retrieval, and the procedure is repeated from step S21c (step S21i). If the next data unit group does not exist, the retrieval result is displayed and this procedure terminates (step S21j).

When the data unit groups are related each other, instead of the incrementing of variable N, the binary tree for the relational information is traced from the root node, and the data unit group corresponding to the leaf relational information is searched. If the two arcs directing the child node for the relational information are ordered, the selecting order is promised by searching first the child node having a priority.

Using the procedure described above, it become possible to freely select a plurality of the document groups which is scattered in the file system with other file items, and to retrieve the data unit from the selected data unit groups.

In the following, the procedure to display the detailed contents of the retrieved data unit and the data unit group which includes the displayed data unit is explained.

Figure 22:
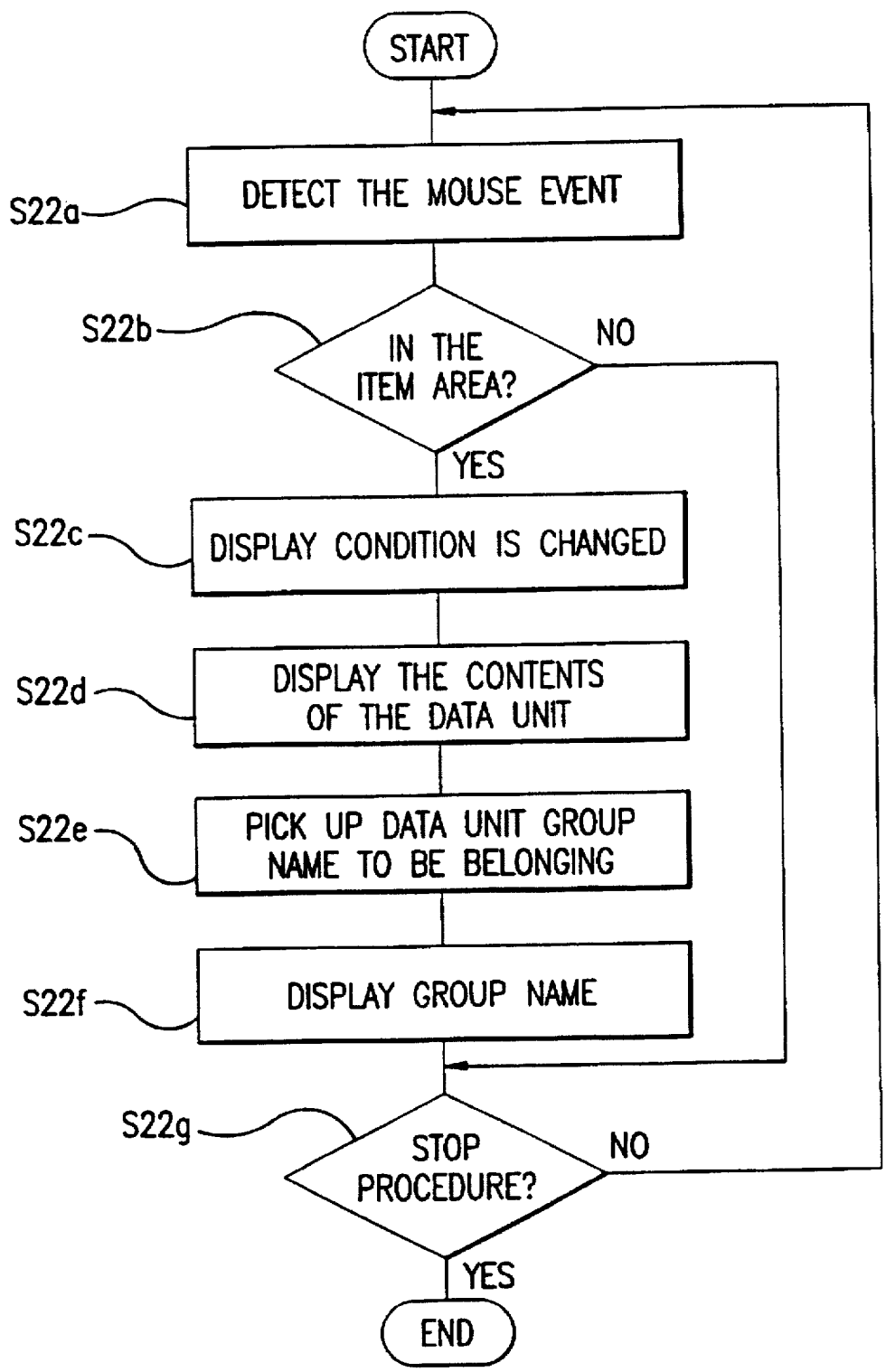
FIG. 22 is a flowchart of the procedure to select the data unit and to display the detailed contents of the selected data unit.
Figure 23:
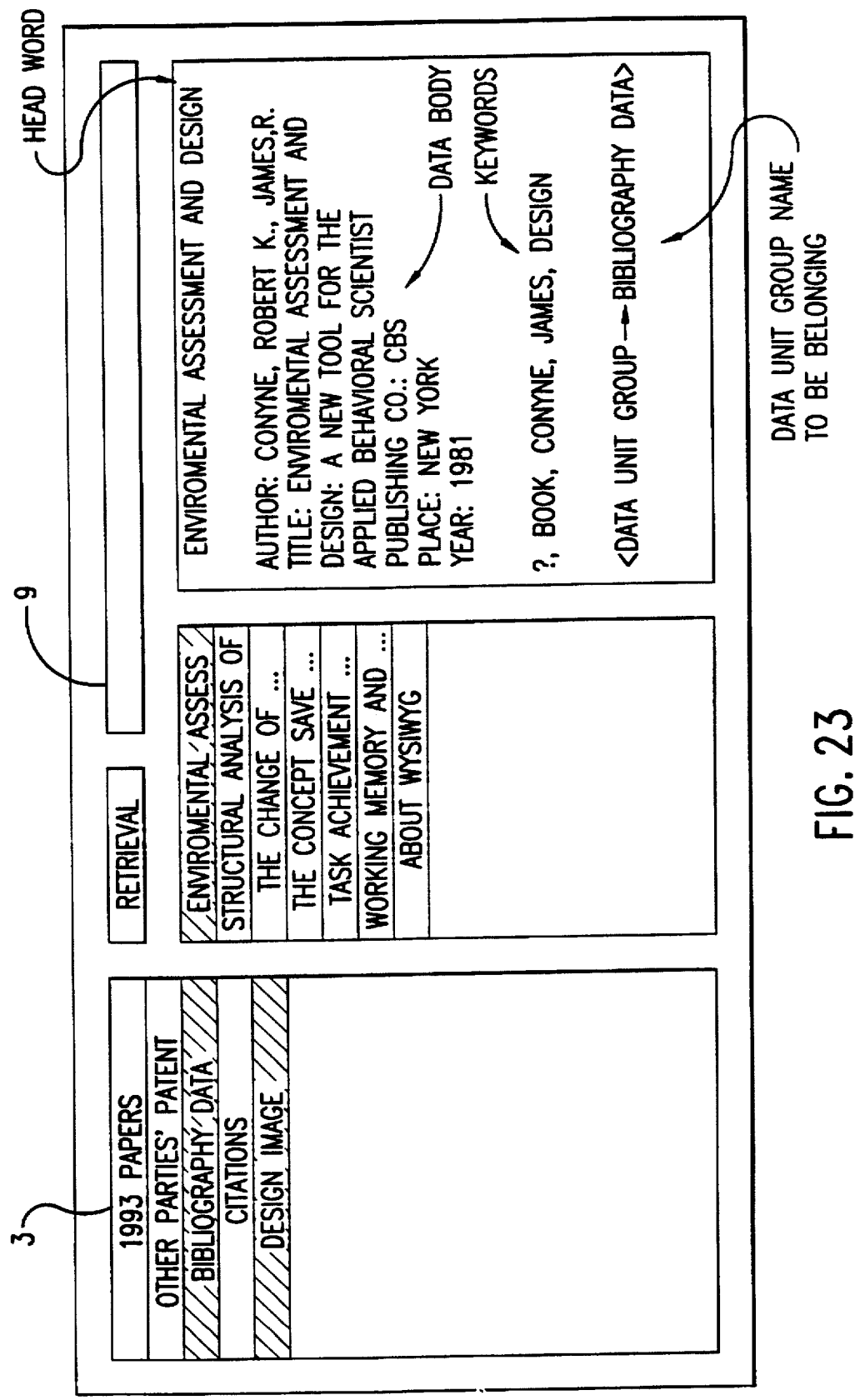
FIG. 23 is an example showing the display of the detailed contents of the selected data unit.

FIG. 22 shows a flowchart of this procedure. At first, a mouse event is detected (step S22a), and it is checked whether the event happens in the area where displays the list of the name of the retrieved data units (step S22b). If the event happens in the list, a list selection procedure is executed, that is to say, the area for the selected data unit is shaded in this embodiment (step S22c). Then, the contents of the selected data unit are displayed in accordance with the group name and the existing location stored in the selection result storing section 7 (step S22d). In the next, the name of the data unit group which includes the selected data unit is picked up from the retrieval result stored in the selection result storing section (step S22e), and is also displayed (step S22f). FIG. 23 is an example of the display of the detailed contents of the data unit and the group name. The procedure from step S22a to step S22f is repeated as far as a user inputs an instruction to stop this procedure (step S22g). By the execution of this procedure, a user can know the detailed contents of the selected data unit and the data unit group which includes the selected data unit.

(Second embodiment)

Figure 24:
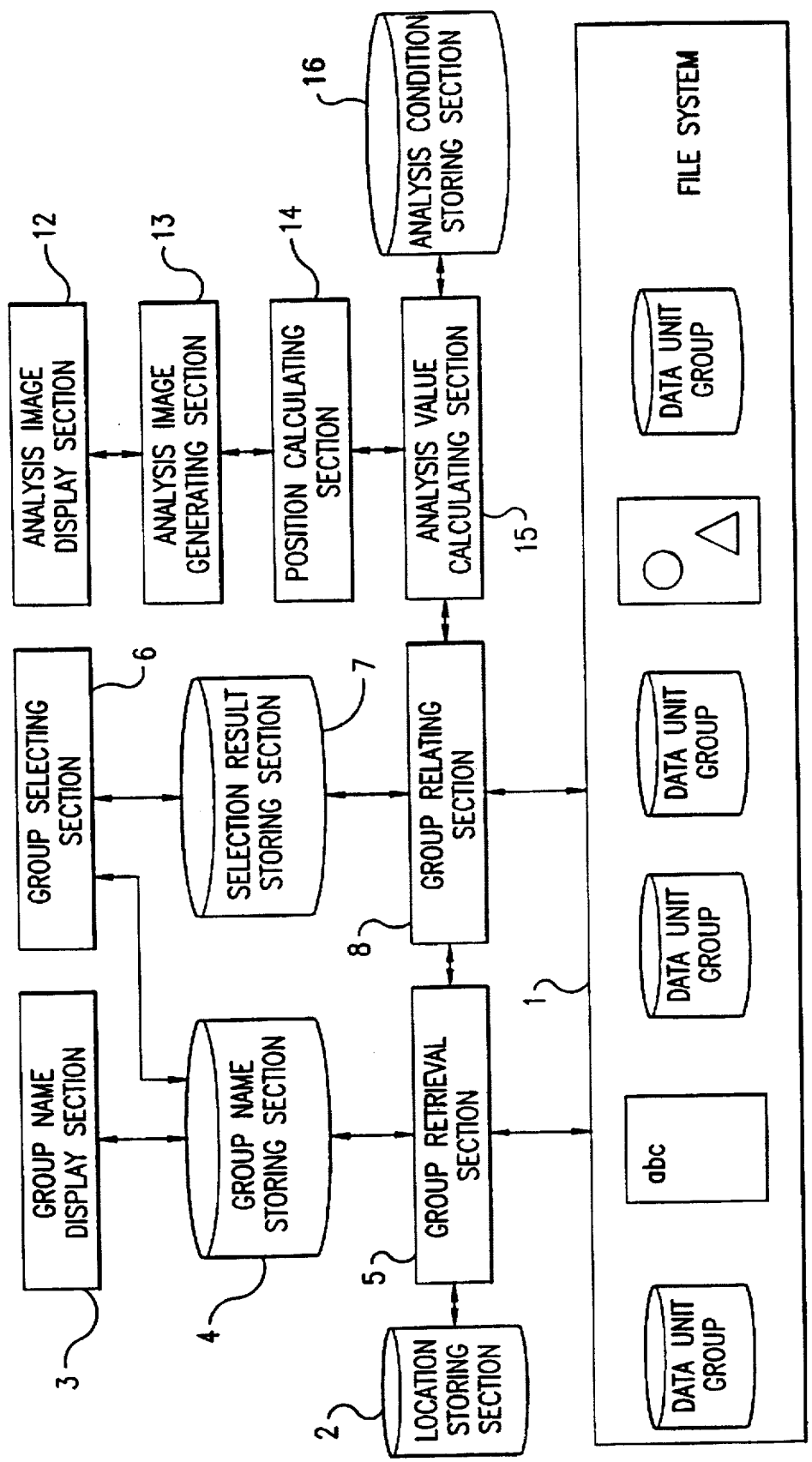
FIG. 24 is a block diagram illustrating the data unit group handling apparatus of the second embodiment according to the present invention.

FIG. 24 shows a block diagram of the data handling system of the second embodiment to analyze the data units stored in a plurality of data unit groups simultaneously. FIG. 24 includes a file system 1, a location storing section 2, group name display section 3, group name storing section 4, group retrieval section 5, a group selecting section 6, a selection result storing section 7 and a group relating section 8, which are same as explained in the first embodiment, and further includes an analysis image display section 12, an analysis image generating section 13, a position calculating section 14 and an analysis value calculating section 15 and an analysis condition storing section 16. The analysis condition storing section 16 stores a plurality of analysis condition to calculate the analysis value for each of the data unit included in the data unit groups related one another by the group relating section 8. The analysis value calculating section 15 calculates the analysis value for each of the data unit in accordance with the analysis condition stored in the analysis condition storing section 16. The position calculating section 14 calculates the position to place an image element representing the data unit in accordance with the analysis value calculated by the analysis condition calculating section 15. The analysis image generating section 13 place the image element on the position calculated by the position calculating section 14 to generate the analysis image. And the analysis image display section 12 display the analysis image generated by the analysis image generating section 13.

The image elements, each of which corresponds to data unit stored in one of the selected data unit groups are placed on the screen in accordance with the contents of the data unit to enable to analyze the selected data unit groups simultaneously. In this embodiment, a plurality of search keys (analysis items) are placed in a horizontal direction and the image element for the data unit is randomly placed in the vertical direction on the analysis item if the data unit includes the keyword corresponding to the analysis item.

Figure 25:
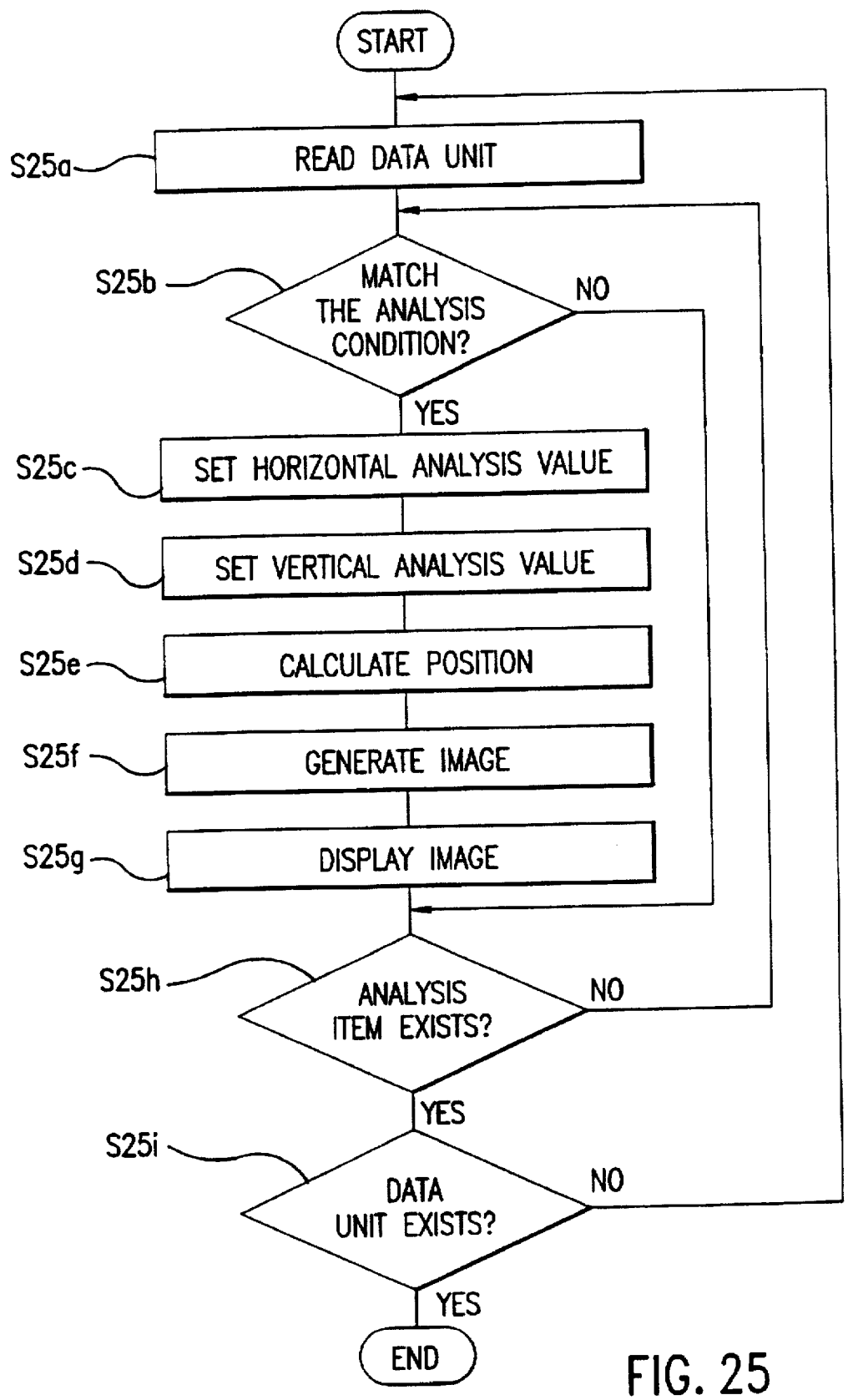
FIG. 25 is a flowchart of the procedure to analyze the data units in the selected data unit groups and to display the image of the analysis chart.

FIG. 25 is a flowchart of the analyzing procedure. Since the procedure before the relating of the data unit groups one another is same as described in the first embodiment, it is not explained here. In the following, the procedure after the relating of the selected data unit groups is explained. At first, the data units stored in the selected data unit groups are retrieved one by one. The selected data unit groups are related one another by the binary tree and the binary tree is traced to search one of the data unit groups as described in the first embodiment (step S25a). Then, the analysis items stored in the analysis condition storing section 16 is retrieved one by one, and the analysis value calculating section 15 compares the data unit retrieved in step S25a with the retrieved analysis item. FIG. 26 shows an example of the analysis conditions stored in the analysis condition storing section 16. In this case, "design", "image" and "sense" are the analysis items to be arranged in the horizontal direction. The number "10", "20" and "30" following to each of the analysis items represent the analysis values which are used as described later. The analysis condition for the vertical direction is not specified here (step S25b). If the data unit matches the analysis condition, for instance, the data unit includes a keyword corresponding to the analysis item, the analysis value of the matched analysis item is set to the horizontal analysis value of the data unit (step S25c). Further, the vertical analysis value of the data unit is also set, in this case it is determined by the random value (step S25d). Then, the position calculating section 15 calculates the position on the screen where the image element of the data unit is placed in accordance with the horizontal and vertical analysis values. In this example, the analysis value of the data unit is directly assigned to the position of the data unit (step S25e). In the next, the analysis image generating section 13 generates the analysis image by adding the new image element on the position determined by the position calculating section 14 (step S25f), and the generated analysis image is displayed on the analysis image display section 12 (step S25g). The procedure from step S25b to step S25g is repeated for each of the data units as far as the rest of the analysis item exists (step S25h). Further, the procedure from step S25a to step S25h is repeated until all data units stored in the selected data unit groups related one another are read (step S25i).

Figure 27:
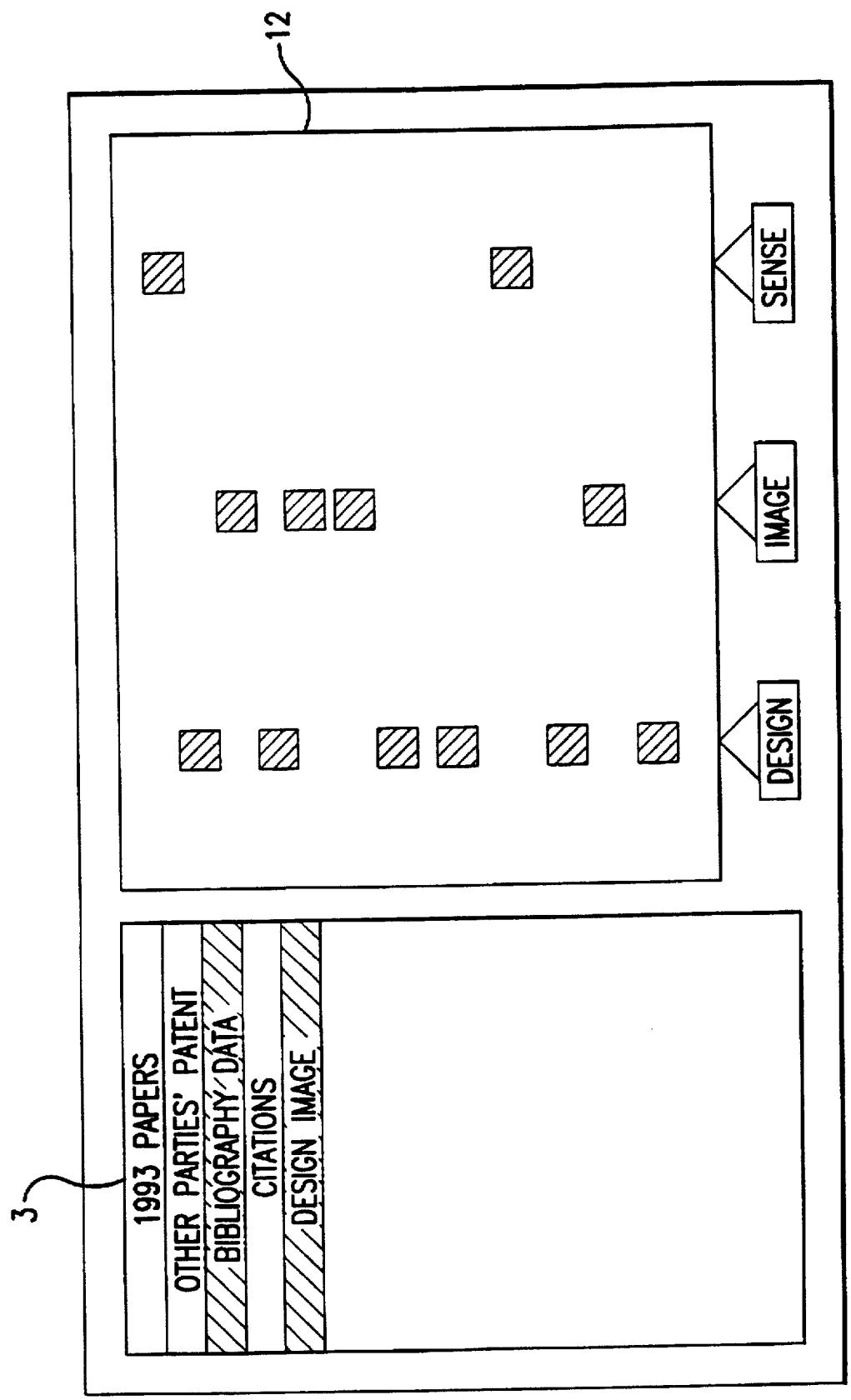
FIG. 27 is an example showing the display of the image of the analysis chart.

FIG. 27 shows an example of the analysis image generated by the procedure described above. In this figure, image elements (dots) representing the existence of the data units which includes each of the analysis items as a keyword are placed on the screen.

The analysis conditions storing in the analysis condition storing section can be separated in some groups. In this case, one of the groups for the analysis condition is selected in advance to use an the analysis and the displaying. Further, user can combine some of the analysis items to make an analysis condition, or determine the analysis condition freely. In those of cases, a procedure to change the display of the axis in FIG. 27 must be needed.

Using the procedure described above, a plurality of the data unit groups can be selected freely from the data unit groups which are scattered about among the other file items in the file system, and the selected data unit groups are analyzed simultaneously.

Any kind of data unit groups can be used in this system as far as they have the same file format, such as the one shown in FIG. 3. For example, the dictionary database and multimedia database including sound and image can be used as the data unit group.

As described above, a plurality of the data unit groups are freely and dynamically selected from the data unit groups which exist in scatter with the other file items in an ordinary file system, and the selected data unit groups are searched or analyzed simultaneously and easily.

In particular, when a plurality of the data unit groups are selected simultaneously and the data units are retrieved from the selected data unit groups, a user can know which data unit group includes the retrieved data unit, by displaying the name of the data unit group graphically connected with the displayed contents of the retrieved data unit.

Since the location in the file system is stored in advance to limit the scope to retrieve the available data unit groups, the available data unit groups are provided effectively to the user.

Further, the available data unit groups are retrieved in accordance with the directory structure of the file.

Further, it is possible to select the data unit group dynamically with the order of the selection, and to retrieve the data unit from one of the selected data unit group and then further to retrieve the data unit from another data unit groups using the result retrieved from the data unit group of the previous order as a search condition, in accordance with the order of the selection.

Further, by relating the data unit groups to be processed one another and keeping the relation, the combination of the data unit groups can be easily created.

What is claimed is:

1. A data unit group handling method for managing a file system which stores a plurality of files defined by different kind of file formats, and at least one of the files is a data unit group which is defined by a predetermined file format, includes data units and can be located in any location in the file system, comprising the steps of;

retrieving at least one data unit group from said file system in accordance with the file format;

receiving a selection instruction from a user to select at least one of the data unit group from the retrieved at least one data unit group;

receiving retrieval condition to retrieve at least one data unit; and retrieving at least one of the data unit corresponding to the received retrieval condition from the at least one of the data unit group which is selected in accordance With the received selection instruction.

2. A data unit group handling method for managing a file system which stores a plurality of files defined by different kind of file formats, and at least one of the files is a data unit group which is defined by a predetermined file format, includes data units and can be located in any location in the file system, comprising the steps of;

retrieving at least one data unit group from said file system in accordance with the file format;

receiving a selection instruction from a user to select at least one of the data unit group from the retrieved at least one data unit group;

receiving retrieval condition to retrieve at least one data unit;

storing a analysis condition to analyze the data unit in advance;

calculating an analysis value of the data unit included in said at least one of the data unit group which is selected in accordance with the received selection instruction, in accordance with the stored analysis condition;

calculating a position where an image element which graphically represents existence of the data unit is arranged; and generating the analysis image which includes the image element of the data unit at the calculated position.

3. A data unit group handling apparatus comprising:

a file system for storing a plurality of files defined by different kind of file formats, and at least one of the files is a data unit group which is defined by a predetermined file format, includes data units and can be located in any location in the file system;

group retrieving means for retrieving at least one data unit group from said file system in accordance with the file format;

group selecting means for receiving a selection instruction from a user to select at least one of the data unit group from the at least one data unit group retrieved by said group retrieving means;

retrieval condition receiving means for receiving retrieval condition to retrieve at least one data unit; and data unit retrieving means for retrieving at least one of the data unit matching to the retrieval condition received by said retrieval condition receiving means from the at least one of the data unit group which is selected in accordance with the selection instruction received by the group selecting means.

4. A data unit group handling apparatus as defined in claim 3 further comprising, retrieval result display means for displaying the data unit retrieved by the data unit retrieving means.

5. A data unit group handling apparatus as defined in claim 3, further comprising, identifier storing means for storing an identifier for each of the data unit group retrieved by said group retrieval means;

identifier display means for displaying the identifier stored in said identifier storing means; and wherein said group selecting means provides a button to receive the selection instruction connected with the identifier displayed by said identifier display means and detects said button receiving the selection instruction to select at least one of the data unit group.

6. A data unit group handling apparatus as defined in claim 5, wherein said data unit retrieving means retrieves the identifier of the data unit group which includes the retrieved data unit, and further comprising, retrieval result display means for displaying the retrieved identifier of the data unit group graphically connected with the retrieved data unit.

7. A data unit group handling apparatus as defined in claim 3, further comprising, location storing means for storing the location in the file system to limit the scope of the retrieval of the group retrieval means; and wherein said group retrieval means retrieves the data unit group from the location in the file system stored in said location storing means.

8. A data unit group handling apparatus comprising:

a file system for storing a plurality of files defined by different kind of file formats, and at least one of the files is a data unit group which is defined by a predetermined file format, includes data units and can be located in any location in the file system;

group retrieving means for retrieving at least one data unit group from said file system in accordance with the file format;

group selecting means for receiving a selection instruction from a user to select at least one of the data unit group from the at least one data unit group retrieved by said group retrieving means;

analysis condition storing means for storing a analysis condition to analyze the data unit;

analysis value calculating means for calculating an analysis value of the data unit included in said at least one of the data unit group selected by said group selecting means in accordance with the analysis condition stored in said analysis condition storing means; and position calculating means for calculating a position where an image element which graphically represents existence of the data unit is arranged;

analysis image generating means for generating the analysis image which includes the image element of the data unit at the position calculated by said position calculated means.

9. A data unit group handling apparatus as defined in claim 8 further comprising, analysis image displaying means for displaying the analysis image generated by said analysis image generating means.

10. A data unit group handling apparatus as defined in claim 8 further comprising, identifier storing means for storing an identifier each of the data unit group retrieved by said group retrieval means;

identifier display means for displaying the identifier stored in said identifier storing means; and wherein said group selecting means provides a button to receive the selection instruction connected with the identifier displayed by said identifier display means and detects said button receiving the selection instruction to select at least one of the data unit group.

11. A data unit group handling apparatus as defined in claim 8, further comprising, location storing means for storing the location in the file system to limit the scope of the retrieval of the group retrieval means; and wherein said group retrieval means retrieves the data unit group from the location in the file system stored in said location storing means.

12. A data unit group handling apparatus comprising:

a file system for storing a plurality of files defined by different kind of file formats, and at least one of the files is a data unit group which is structured by a predetermined directory structure and can be located in any location in the file system;

group retrieving means for retrieving at least one data unit group from said file system in accordance with the file format;

identifier storing means for storing the identifier of the data unit group retrieved by said group retrieving means; and identifier display means for displaying the identifier stored in said identifier storing means.

13. A data unit group handling apparatus as defined claim 12, wherein said group retrieving means retrieves a file defined by a predetermined directory structure which includes a data file which stores a data unit having a pair of a head word and a data body, a index file which stores corresponding relation between a search key inputted to retrieve at least one of the data units and an address of the data unit in the data file corresponding to the search key, and a hash table file to convert the search key into an address of the corresponding relation in the index file corresponding to the search key.

14. A data unit group handling apparatus comprising:

a plurality of data unit groups each of which have an identifier and includes at least one data unit;

identifier display means for displaying the identifiers of the data unit groups;

group selecting means for receiving a selection instruction from a user to select at least two of the data unit groups in order from the data unit groups whose identifier is displayed by said identifier display means;

selected group storing means for storing the identifier of the data unit groups selected by said group selecting means with the order of selection;

retrieval condition receiving means for receiving retrieval condition;

data unit retrieval means for retrieving the data unit corresponding to the retrieval condition received by said retrieval condition receiving means from one of said data unit group in first order and for retrieving the data unit corresponding to the data unit retrieved from the data unit group in the first order from the data unit group in second order in accordance with the identifier of the data unit and its order stored in said selected group storing means; and retrieval result display means for displaying the data unit retrieved from said data unit group in a second order.

15. A data unit group handling apparatus as defined by claim 3 further comprising, relation storing means for storing the relational information which relates a plurality of the data unit groups one another;

relation selecting means for receiving a relation selection instruction from a user to select the relational information stored in said relation storing means;

relation creating means for creating new relational information which relates both of the data unit group selected by said group selecting means and the relational information selected by said relation selecting means; and wherein said retrieving means retrieves data unit from the data unit groups related one another in accordance with the newly created relational information by said relation creating means.

16. A data unit group handling apparatus as defined by claim 8 further comprising:

relation storing means for storing the relational information which relates a plurality of the data unit groups one another;

relation selecting means for receiving a relation selection instruction from a user to select the relational information stored in said relation storing means;

relation creating means for creating new relational information which relates both of the data unit group selected by said group selecting means and the relational information selected by said relation selecting means; and wherein said analysis value calculating means calculates the analysis value of the data unit included in the data unit groups related one another in accordance with the newly created relational information by said relation creating means.

* * * * *